United States Patent
Singh et al.

(10) Patent No.: US 10,720,249 B2
(45) Date of Patent: Jul. 21, 2020

(54) PASSIVE REACTOR COOLING SYSTEM

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC, Marlton, NJ (US)

( * ) Notice: Subject to any disclaimer, the term of this patent is extended or adjusted under 35 U.S.C. 154(b) by 290 days.

(21) Appl. No.: 15/419,227

(22) Filed: Jan. 30, 2017

(65) Prior Publication Data
US 2017/0200515 A1 Jul. 13, 2017

Related U.S. Application Data

(60) Division of application No. 14/289,525, filed on May 28, 2014, now Pat. No. 9,589,685, which is a (Continued)

(51) Int. Cl.
*G21C 15/18* (2006.01)
*G21C 13/02* (2006.01)
(Continued)

(52) U.S. Cl.
CPC ............. *G21C 15/18* (2013.01); *G21C 13/02* (2013.01); *G21C 15/12* (2013.01); *G21D 1/006* (2013.01);
(Continued)

(58) Field of Classification Search
CPC ........ G21C 15/18; G21C 15/12; G21C 13/00; G21C 13/02
See application file for complete search history.

(56) References Cited

U.S. PATENT DOCUMENTS 2,890,009 A 6/1959 Chapellier
3,320,969 A 5/1967 Gordon
(Continued)

FOREIGN PATENT DOCUMENTS

CN 102194533 9/2011
CN 103000233 3/2013
(Continued)

OTHER PUBLICATIONS

Chung, Young-Jong, et al. "Passive cooldown performance of a 65 MW integral reactor." Nuclear Engineering and Design238.7 (2008): 1681-1689. (Year: 2008).*

(Continued)

*Primary Examiner* — Lily C Garner
(74) *Attorney, Agent, or Firm* — The Belles Group, P.C.

(57) ABSTRACT

A nuclear reactor cooling system with passive cooling capabilities operable during a reactor shutdown event without available electric power. In one embodiment, the system includes a reactor vessel with nuclear fuel core and a steam generator fluidly coupled thereto. Primary coolant circulates in a flow loop between the reactor vessel and steam generator to heat secondary coolant in the steam generator producing steam. The steam flows to a heat exchanger containing an inventory of cooling water in which a submerged tube bundle is immersed. The steam is condensed in the heat exchanger and returned to the steam generator forming a closed flow loop in which the secondary coolant flow is driven by natural gravity via changes in density from the heating and cooling cycles. In other embodiments, the cooling system is configured to extract and cool the primary coolant directly using the submerged tube bundle heat exchanger.

14 Claims, 19 Drawing Sheets

Related U.S. Application Data continuation-in-part of application No. PCT/US2013/042070, filed on May 21, 2013.

(60) Provisional application No. 61/827,943, filed on May 28, 2013, provisional application No. 61/649,593, filed on May 21, 2012.

(51) Int. Cl.
*G21C 15/12* (2006.01)
*G21D 1/00* (2006.01)
G21C 9/004 (2006.01)

(52) U.S. Cl.
CPC ............... *G21C 9/004* (2013.01); *G21D 1/00* (2013.01); *Y02E 30/40* (2013.01)

(56) References Cited

U.S. PATENT DOCUMENTS

| | | | |
|---|---|---|---|
| 3,563,855 A | 2/1971 | Marko | |
| 3,888,730 A | 6/1975 | Jackson | |
| 4,080,256 A | 3/1978 | Braun et al. | |
| 4,175,005 A | 11/1979 | Harstead | |
| 4,478,784 A | 10/1984 | Burelbach | |
| 4,508,677 A | 4/1985 | Craig et al. | |
| 4,678,626 A | 7/1987 | Germer | |
| 4,752,439 A | 6/1988 | Elter et al. | |
| 4,765,946 A | 8/1988 | Dagard et al. | |
| 5,011,652 A * | 4/1991 | Tominaga | G21C 15/18 376/282 |
| 5,043,135 A | 8/1991 | Hunsbedt et al. | |
| 5,049,353 A | 9/1991 | Conway et al. | |
| 5,087,408 A | 2/1992 | Tominaga et al. | |
| 5,091,143 A | 2/1992 | Tate et al. | |
| 5,096,659 A | 3/1992 | Hidaka et al. | |
| 5,154,877 A | 10/1992 | Schultz et al. | |
| 5,217,682 A | 6/1993 | Spinks et al. | |
| 5,272,737 A | 12/1993 | Fujii et al. | |
| 5,282,230 A | 1/1994 | Billig et al. | |
| 5,345,481 A | 9/1994 | Oosterkamp | |
| 5,345,482 A | 9/1994 | Conway et al. | |
| 5,349,616 A | 9/1994 | Nakayama et al. | |
| 5,426,681 A * | 6/1995 | Aburomia | G21C 9/004 376/282 |
| 5,442,668 A | 8/1995 | Todreas et al. | |
| 5,499,277 A | 3/1996 | Hunsbedt et al. | |
| 6,718,001 B2 * | 4/2004 | Hidaka | G21C 15/18 376/283 |
| 8,687,759 B2 | 4/2014 | Reyes, Jr. et al. | |
| 2002/0101951 A1 | 8/2002 | Nakamaru et al. | |
| 2009/0129531 A1 | 5/2009 | Reyes, Jr. et al. | |
| 2011/0158371 A1 * | 6/2011 | Sato | G21C 1/086 376/249 |
| 2011/0314858 A1 | 12/2011 | Tahara et al. | |
| 2012/0076255 A1 | 3/2012 | Jain et al. | |
| 2012/0207260 A1 * | 8/2012 | Houghton | G21D 1/02 376/210 |
| 2013/0051511 A1 | 2/2013 | Watson et al. | |
| 2013/0272474 A1 | 10/2013 | Conway et al. | |

FOREIGN PATENT DOCUMENTS

| | | |
|---|---|---|
| CN | 202948738 | 5/2013 |
| DE | 2642352 A1 | 3/1978 |
| DE | 3517632 A1 | 11/1986 |
| DE | 19703441 A1 | 8/1998 |
| EP | 0232186 | 8/1987 |
| EP | 0528672 A1 | 2/1993 |
| JP | S 63-217296 A | 9/1988 |
| JP | H 02-176496 | 7/1990 |
| JP | H 02296196 A | 12/1990 |
| JP | H 03-18793 A | 1/1991 |
| JP | H 05-087697 | 4/1993 |
| JP | H 07-198885 A | 8/1995 |
| JP | 2004-245763 A | 9/2004 |
| JP | H 04-125495 A | 3/2006 |
| JP | 2006138744 | 6/2006 |
| JP | 2007-297854 A | 11/2007 |
| JP | 2010-203858 A | 9/2010 |
| JP | 2010-236885 A | 10/2010 |
| JP | 2011-232179 A | 11/2011 |
| JP | 2012-198168 A | 10/2012 |
| RU | 2073920 C1 | 2/1997 |
| RU | 2271585 C1 | 3/2006 |
| WO | WO 2009/064654 A2 | 5/2009 |
| WO | WO 2013/177196 | 11/2013 |

OTHER PUBLICATIONS

Corresponding Supplementary European Search Report for EP14803488 dated Feb. 17, 2017.
International Search Report and Written Opinion for corresponding application No. PCT/US2013/042070 dated Oct. 22, 2013, pp. 1-13.
Supplemental European International Search Report for corresponding Application No. EP 13793498.0-1556 dated Jun. 27, 2016, pp. 1-14.

* cited by examiner

PASSIVE REACTOR COOLING SYSTEM

CROSS-REFERENCE TO RELATED PATENT APPLICATIONS

The present application is a divisional of U.S. patent application Ser. No. 14/289,525 filed May 28, 2014 which claims the benefit of U.S. Provisional Patent Application No. 61/827,943 filed May 28, 2013. U.S. patent application Ser. No. 14/289,525 is further a continuation-in-part of International Patent Application No. PCT/US13/42070 filed May 21, 2013, which claims the benefit of U.S. Provisional Patent Application No. 61/649,593 filed May 21, 2012; the entireties of all of the foregoing disclosures being incorporated herein by reference.

FIELD OF THE INVENTION

The present invention relates nuclear reactors, and more particularly to a reactor and reactor containment system with passive reactor cooling system for reactor shutdown operation.

BACKGROUND OF THE INVENTION

The containment for a nuclear reactor is defined as the enclosure that provides environmental isolation to the nuclear steam supply system (NSSS) of the plant in which nuclear fission is harnessed to produce pressurized steam. A commercial nuclear reactor is required to be enclosed in a pressure retaining structure which can withstand the temperature and pressure resulting from the most severe accident that can be postulated for the facility. The most severe energy release accidents that can be postulated for a reactor and its containment can be of two types.

First, an event that follows a loss-of-coolant accident (LOCA) and involve a rapid large release of thermal energy from the plant's nuclear steam supply system (NSSS) due to a sudden release of reactor's coolant in the containment space. The reactor coolant, suddenly depressurized, would violently flash resulting in a rapid rise of pressure and temperature in the containment space. The in-containment space is rendered into a mixture of air and steam. LOCAs can be credibly postulated by assuming a sudden failure in a pipe carrying the reactor coolant.

Another second thermal event of potential risk to the integrity of the containment is the scenario wherein all heat rejection paths from the plant's nuclear steam supply system (NSSS) are lost, forcing the reactor into a "scram." A station black-out is such an event. The decay heat generated in the reactor must be removed to protect it from an uncontrolled pressure rise.

More recently, the containment structure has also been called upon by the regulators to withstand the impact from a crashing aircraft. Containment structures have typically been built as massive reinforced concrete domes to withstand the internal pressure from LOCA. Although its thick concrete wall could be capable of withstanding an aircraft impact, it is also unfortunately a good insulator of heat, requiring pumped heat rejection systems (employ heat exchangers and pumps) to reject its unwanted heat to the external environment (to minimize the pressure rise or to remove decay heat). Such heat rejection systems, however, rely on a robust power source (off-site or local diesel generator, for example) to power the pumps. The station black out at Fukushima in the wake of the tsunami is a sobering reminder of the folly of relying on pumps. The above weaknesses in the state-of-the-art call for an improved nuclear reactor containment system.

Besides the foregoing containment cooling issues, a nuclear reactor continues to produce a substantial quantity of heat energy after it has been shut down. FIG. 20 shows a typical heat generation curve of a light water reactor subsequent to a scram (i.e., a sudden cessation of chain reaction by a rapid insertion of control rods or other means). In the current reactor designs, as noted above, the reactor's decay heat is removed by the plant's residual heat removal (RHR) system which utilizes a system of pumps and heat exchangers to convey the heat energy to a suitable source of cooling water maintained by the plant. As can be seen from FIG. 20, the reactor's decay heat begins to attenuate exponentially with time but is still quite significant to threaten the reactor's safety if the generated heat were not removed (as was the case at Fukushima where the pumps needed to extract the reactors' heat failed because of submergence of their electric motors in the tsunami driven water surge). The Fukushima disaster provided a stark lesson in the vulnerability of forced flow (pump dependent) systems under extreme environmental conditions.

An improved reactor cooling system is desired.

SUMMARY OF THE INVENTION

A reactor cooling system according to the present disclosure provides a completely passive means to reject the reactor's decay heat without any reliance on and drawbacks of pumps and motors requiring an available electric power supply, as described above. In one embodiment, the cooling system relies entirely on gravity and varying fluid densities to induce flow through the cooling system. In one embodiment, this gravity driven system may be configured and referred to as a submerged bundled cooling system (SBCS) for convenience (this arbitrary nomenclature not being limiting in any respect). The cooling system is engineered to passively extract heat from the reactor primary coolant in the event of a station black out or another postulated accident scenario wherein the normal heat rejection path from the fuel core via the power plant's Rankine cycle is lost.

In one embodiment, a passive nuclear reactor shutdown cooling system includes a reactor vessel housing a nuclear fuel core inside, the reactor vessel containing a primary coolant heated by the fuel core, and a steam generator fluidly coupled to the reactor vessel and containing a liquid secondary coolant. The primary coolant circulates in a first closed flow loop between the reactor vessel and steam generator, the primary coolant transferring heat to the secondary coolant in the steam generator and producing secondary coolant steam. A heat exchanger includes an inventory of a liquid third coolant and a tube bundle, the tube bundle being submerged in the third coolant. The secondary coolant circulates via gravity flow in a second closed flow loop between the submerged tube bundle and the steam generator. The secondary coolant steam is extracted from the steam generator and flows in the second closed flow loop to the tube bundle, condenses forming condensate, and the condensate flows back to the steam generator.

In another embodiment, a passive nuclear reactor shutdown cooling system includes a reactor vessel housing a nuclear fuel core inside, the reactor vessel containing a primary coolant heated by the fuel core, and a heat exchanger including an inventory of cooling water and a tube bundle, the tube bundle being submerged in the cooling water. The primary coolant circulates via gravity flow in a first closed flow loop between the submerged tube bundle and the reactor vessel, wherein the primary coolant transfers heat to the inventory of cooling water in the heat exchanger and is cooled before flowing back to the reactor vessel.

In another embodiment, a method for passively cooling a nuclear reactor after shutdown is provided. The method includes: heating a primary coolant in a reactor vessel with a nuclear fuel core; heating a secondary coolant in a steam generator with the heated primary coolant to produce secondary coolant steam; extracting the secondary coolant steam from the steam generator; flowing the extracted secondary coolant steam through a tube bundle submerged in an inventory of cooling water in a pressure vessel; condensing the secondary coolant steam forming a secondary coolant condensate; and returning the secondary coolant condensate to the steam generator, wherein the secondary coolant steam and condensate circulates through a first closed flow loop between the tube bundle and steam generator. In one embodiment, the method further includes: heating of the cooling water in the pressure vessel by the secondary coolant steam; converting a portion of the cooling water into steam phase; extracting the cooling water steam from the pressure vessel; flowing the extracted cooling water steam through heat dissipater ducts attached to a reactor containment vessel in thermal communication with a heat sink; condensing the cooling water steam; and returning the condensed cooling water to the pressure vessel to replenish the inventory of cooling water.

Another method for passively cooling a nuclear reactor after shutdown is provided. The method includes: heating a primary coolant in a reactor vessel with a nuclear fuel core; extracting the heated primary coolant from the reactor vessel; flowing the heated primary coolant through a tube bundle submerged in an inventory of cooling water in a pressure vessel; cooling the heated primary coolant to lower its temperature; and returning the cooled primary coolant to the reactor vessel, wherein the primary coolant circulates through a first closed flow loop between the tube bundle and reactor vessel. In one embodiment, the method further includes: heating of the cooling water in the pressure vessel by the secondary coolant steam; converting a portion of the cooling water into steam phase; extracting the cooling water steam from the pressure vessel; flowing the extracted cooling water steam through heat dissipater ducts attached to a reactor containment vessel in thermal communication with a heat sink; condensing the cooling water steam; and returning the condensed cooling water to the pressure vessel to replenish the inventory of cooling water.

According to other aspects, the present invention further provides nuclear reactor containment system that overcomes the deficiencies of the foregoing arrangements for rejecting heat released into the environment within the containment by a thermal event. The containment system generally includes an inner containment vessel which may be formed of steel or another ductile material and an outer containment enclosure structure (CES) thereby forming a double walled containment system. In one embodiment, a water-filled annulus may be provided between the containment vessel and the containment enclosure structure providing an annular cooling reservoir. The containment vessel may include a plurality of longitudinal heat transfer fins which extend (substantially) radial outwards from the vessel in the manner of "fin". The containment vessel thus serves not only as the primary structural containment for the reactor, but is configured and operable to function as a heat exchanger with the annular water reservoir acting as the heat sink. Accordingly, as further described herein, the containment vessel advantageously provides a passive (i.e. non-pumped) heat rejection system when needed during a thermal energy release accident such as a LOCA or reactor scram to dissipate heat and cool the reactor.

In one embodiment according to the present disclosure, a nuclear reactor containment system includes a containment vessel configured for housing a nuclear reactor, a containment enclosure structure (CES) surrounding the containment vessel, and an annular reservoir formed between the containment vessel and containment enclosure structure (CES) for extracting heat energy from the containment space. In the event of a thermal energy release incident inside the containment vessel, heat generated by the containment vessel is transferred to the annular reservoir which operates to cool the containment vessel. In one embodiment, the annular reservoir contains water for cooling the containment vessel. A portion of the containment vessel may include substantially radial heat transfer fins disposed in the annular reservoir and extending between the containment vessel and containment enclosure structure (CES) to improve the dissipation of heat to the water-filled annular reservoir. When a thermal energy release incident occurs inside the containment vessel, a portion of the water in the annulus is evaporated and vented to atmosphere through the containment enclosure structure (CES) annular reservoir in the form of water vapor.

Embodiments of the system may further include an auxiliary air cooling system including a plurality of vertical inlet air conduits spaced circumferentially around the containment vessel in the annular reservoir. The air conduits are in fluid communication with the annular reservoir and outside ambient air external to the containment enclosure structure (CES). When a thermal energy release incident occurs inside the containment vessel and water in the annular reservoir is substantially depleted by evaporation, the air cooling system becomes operable by providing a ventilation path from the reservoir space to the external ambient. The ventilation system can thus be viewed as a secondary system that can continue to cool the containment ad infinitum.

According to another embodiment, a nuclear reactor containment system includes a containment vessel configured for housing a nuclear reactor, a containment enclosure structure (CES) surrounding the containment vessel, a water filled annulus formed between the containment vessel and containment enclosure structure (CES) for cooling the containment vessel, and a plurality of substantially radial fins protruding outwards from the containment vessel and located in the annulus. In the event of a thermal energy release incident inside the containment vessel, heat generated by the containment vessel is transferred to the water filled reservoir in the annulus through direct contact with the external surface of the containment vessel and its fins substantially radial thus cooling the containment vessel. In one embodiment, when a thermal energy release incident occurs inside the containment vessel and water in the annulus is substantially depleted by evaporation, the air cooling system is operable to draw outside ambient air into the annulus through the air conduits to cool the heat generated in the containment (which decreases exponentially with time) by natural convection. The existence of water in the annular region completely surrounding the containment vessel will maintain a consistent temperature distribution in the containment vessel to prevent warping of the containment vessel during the thermal energy release incident or accident.

In another embodiment, a nuclear reactor containment system includes a containment vessel including a cylindrical shell configured for housing a nuclear reactor, a containment enclosure structure (CES) surrounding the containment vessel, an annular reservoir containing water formed between the shell of the containment vessel and containment enclosure structure (CES) for cooling the containment vessel, a plurality of external (substantially) radial fins protruding outwards from the containment vessel into the annulus, and an air cooling system including a plurality of vertical inlet air conduits spaced circumferentially around the containment vessel in the annular reservoir. The air conduits are in fluid communication with the annular reservoir and outside ambient air external to the containment enclosure structure (CES). In the event of a thermal energy release incident inside the containment vessel, heat generated by the containment vessel is transferred to the annular reservoir via the (substantially) radial containment wall along with its internal and external fins which operates to cool the containment vessel.

Advantages and aspects of a nuclear reactor containment system according to the present disclosure include the following:

Containment structures and systems configured so that a severe energy release event as described above can be contained passively (e.g. without relying on active components such as pumps, valves, heat exchangers and motors);

Containment structures and systems that continue to work autonomously for an unlimited duration (e.g. no time limit for human intervention);

Containment structures fortified with internal and external ribs (fins) configured to withstand a projectile impact such as a crashing aircraft without losing its primary function (i.e. pressure & radionuclide (if any) retention and heat rejection); and Containment vessel equipped with provisions that allow for the ready removal (or installation) of major equipment through the containment structure.

BRIEF DESCRIPTION OF THE DRAWINGS

The features of the illustrative embodiments of the present invention will be described with reference to the following drawings, where like elements are labeled similarly, and in which.

Figure 1:
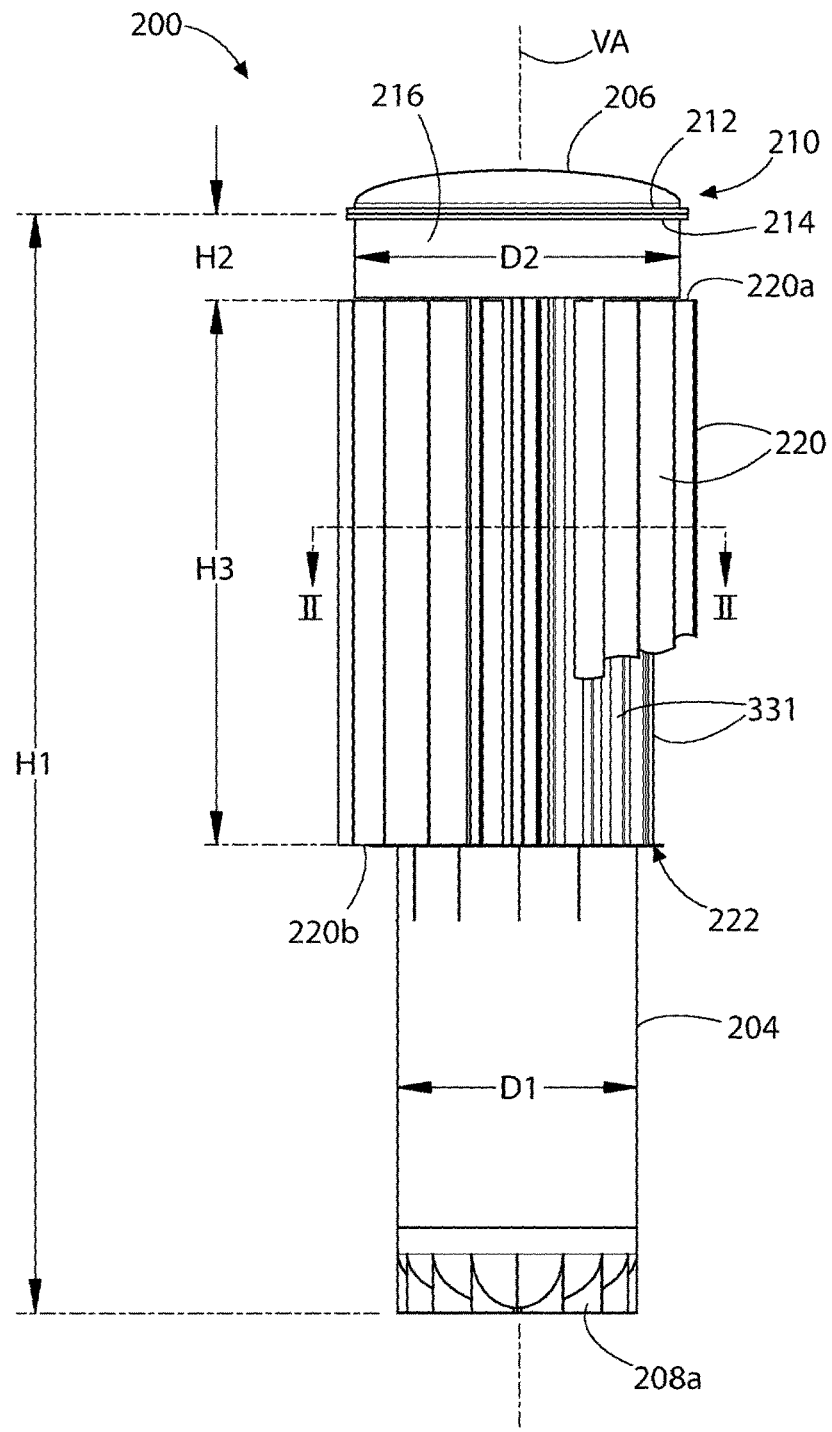
FIG. 1 is side elevation view of a finned primary reactor containment vessel according to the present disclosure which forms part of a nuclear reactor containment system, the lower portions of some fins being broken away in part to reveal vertical support columns and circumferential rib.

All drawings are schematic and not necessarily to scale.

DETAILED DESCRIPTION OF THE EMBODIMENTS

The features and benefits of the invention are illustrated and described herein by reference to illustrative embodiments. This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the nominal orientation as then described or as shown in the drawing under discussion. These relative terms are for convenience of description only and do not require that the apparatus be constructed or operated in a rigorously specific orientation denoted by the term. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such illustrative embodiments illustrating some possible non-limiting combination of features that may exist alone or in other combinations of features.

Referring to FIGS. 1-15, a nuclear reactor containment system 100 according to the present disclosure is shown. The system 100 generally includes an inner containment structure such as containment vessel 200 and an outer containment enclosure structure (CES) 300 collectively defining a containment vessel-enclosure assembly 200-300. The containment vessel 200 and containment enclosure structure (CES) 300 are vertically elongated and oriented, and define a vertical axis VA.

Figure 6:
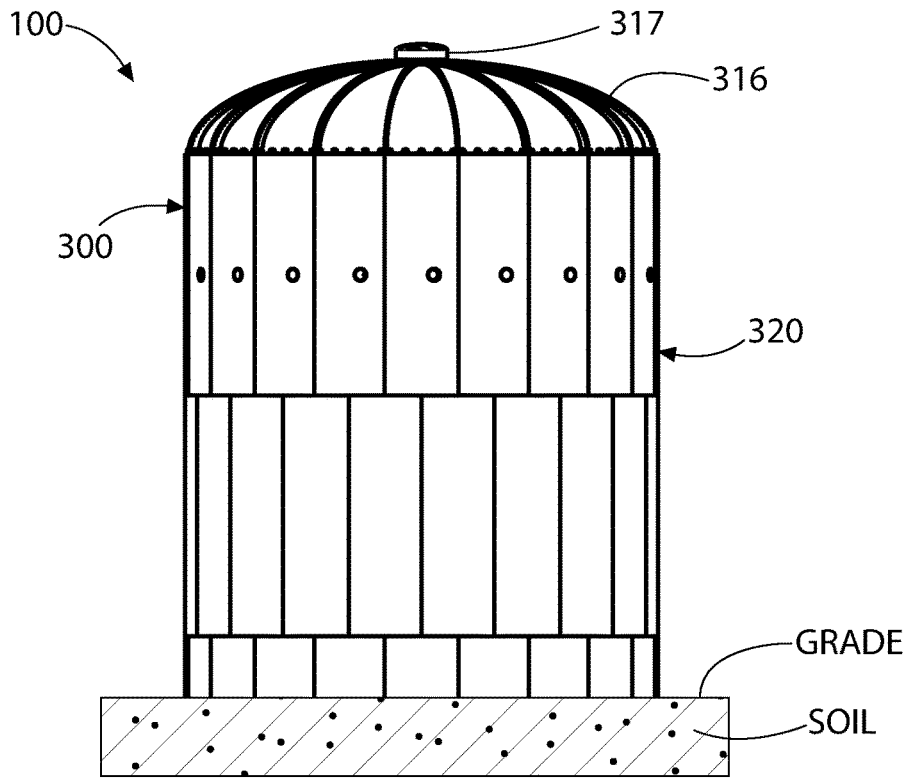
FIG. 6 is a side elevation view of nuclear reactor containment system as installed with the outer containment enclosure structure (CES) being visible above grade.
Figure 7:
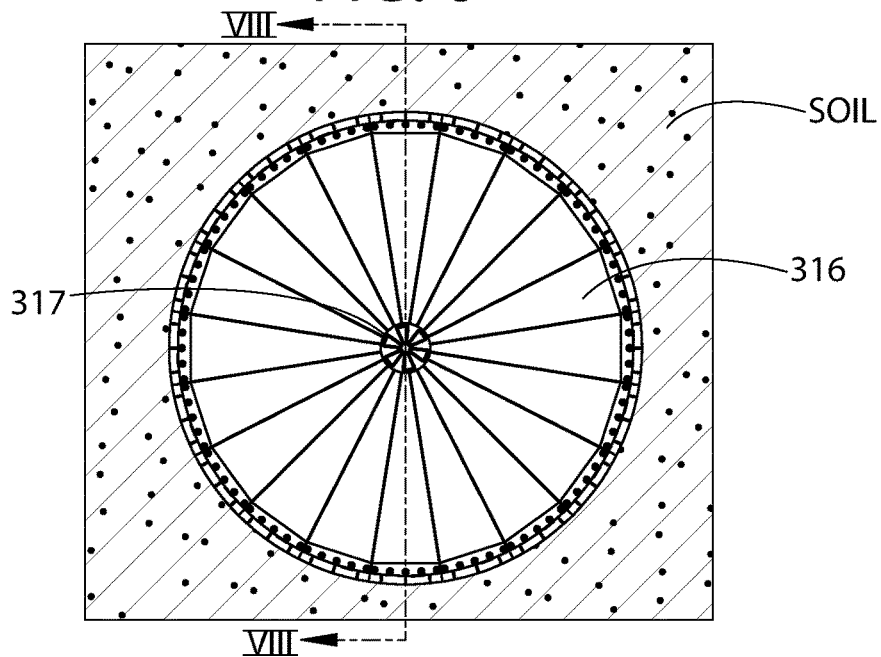
FIG. 7 is a top plan view thereof.
Figure 8:
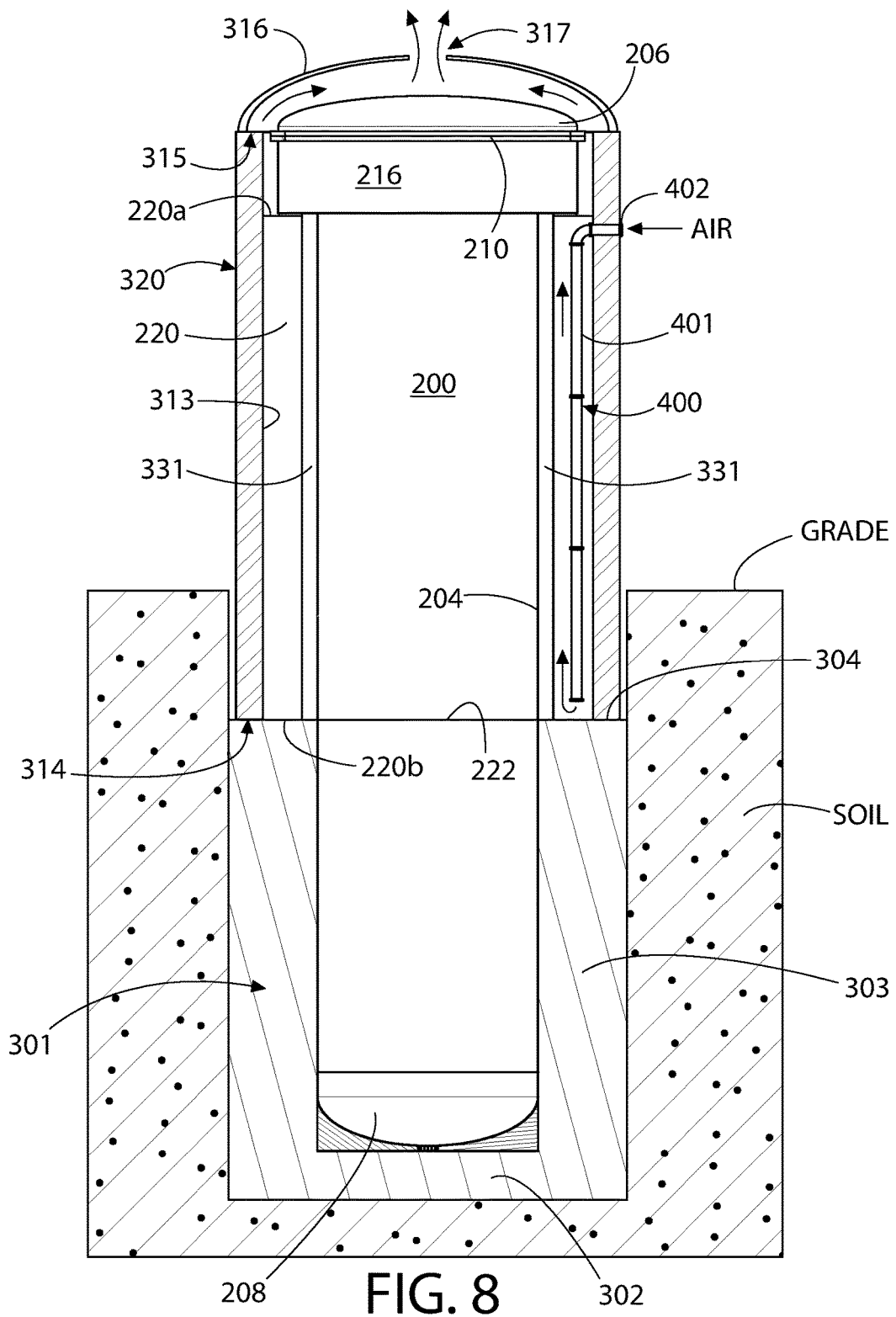
FIG. 8 is longitudinal cross-sectional view thereof taken along line VIII-VIII in FIG. 7 showing both above and below grade portions of the nuclear reactor containment system.
Figures 9, 10:
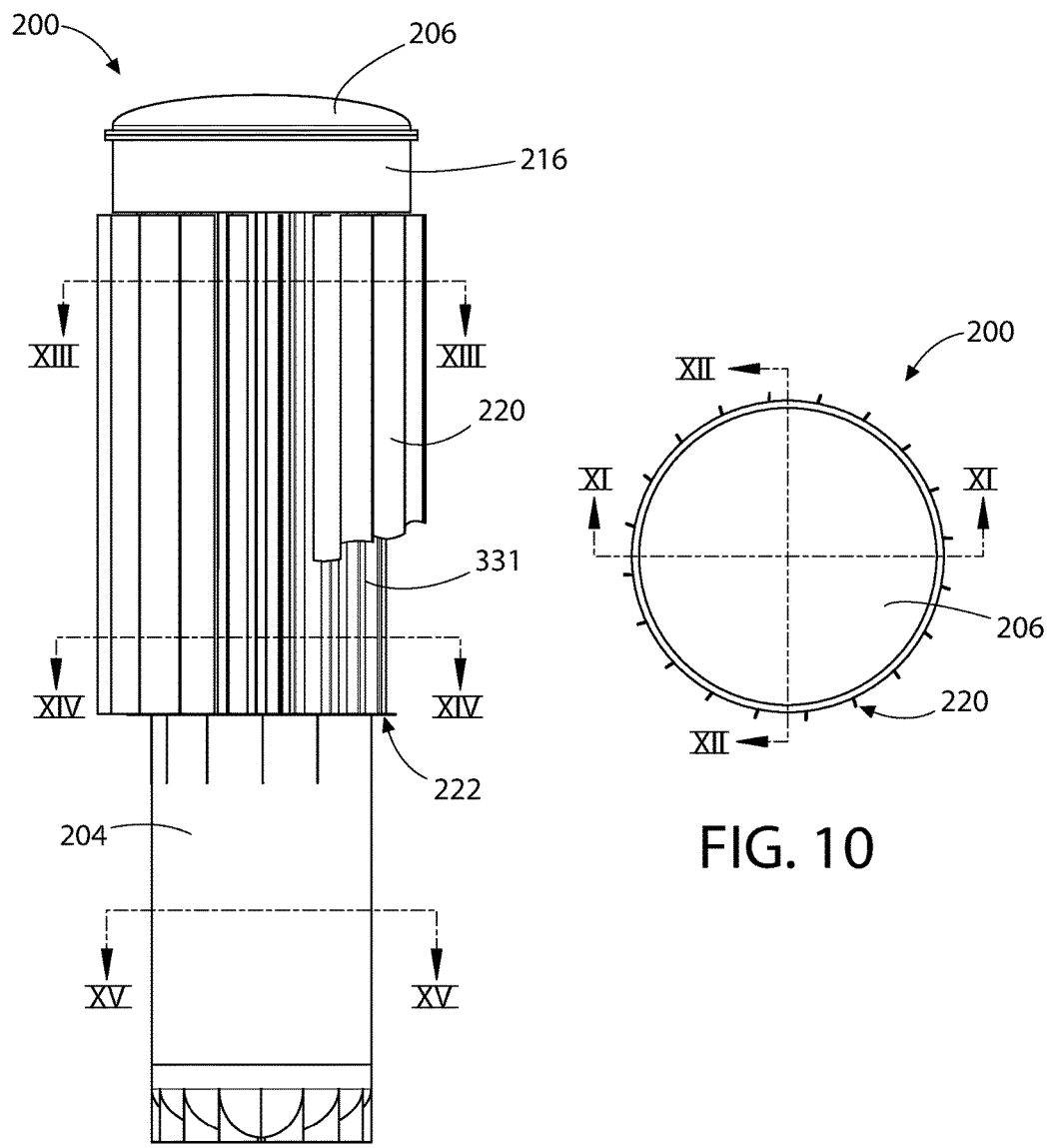
FIG. 9 is side elevation view of the primary reactor containment vessel showing various cross-section cuts to reveal equipment housed in and additional details of the containment vessel.
FIG. 10 is a top plan view thereof.

In one embodiment, the containment vessel-enclosure assembly 200-300 is configured to be buried in the subgrade at least partially below grade (see also FIGS. 6-8). The containment vessel-enclosure assembly 200-300 may be supported by a concrete foundation 301 comprised of a bottom slab 302 and vertically extending sidewalls 303 rising from the slab forming a top base mat 304. The sidewalls 303 may circumferentially enclose containment vessel 200 as shown wherein a lower portion of the containment vessel may be positioned inside the sidewalls. In some embodiments, the sidewalls 303 may be poured after placement of the containment vessel 200 on the bottom slab 302 (which may be poured and set first) thereby completely embedding the lower portion of the containment vessel 200 within the foundation. The foundation walls 303 may terminate below grade in some embodiments as shown to provide additional protection for the containment vessel-enclosure assembly 200-300 from projectile impacts (e.g. crashing plane, etc.). The foundation 301 may have any suitable configuration in top plan view, including without limitation polygonal (e.g. rectangular, hexagon, circular, etc.).

In one embodiment, the weight of the containment vessel 200 may be primarily supported by the bottom slab 302 on which the containment vessel rests and the containment enclosure structure (CES) 300 may be supported by the base mat 304 formed atop the sidewalls 303 of the foundation 301. Other suitable vessel and containment enclosure structure (CES) support arrangements may be used.

With continuing reference to FIGS. 1-15, the containment structure vessel 200 may be an elongated vessel including a hollow cylindrical shell 204 with circular transverse cross-section defining an outer diameter D1, a top head 206, and a bottom head 208. In one embodiment, the containment vessel 200 (i.e. shell and heads) may be made from a suitably strong and ductile metallic plate and bar stock that is readily weldable (e.g. low carbon steel). In one embodiment, a low carbon steel shell 204 may have a thickness of at least 1 inch. Other suitable metallic materials of corresponding appropriate thickness including various alloys may be used.

The top head 206 may be attached to the shell 204 via a flanged joint 210 comprised of a first annular flange 212 disposed on the lower end or bottom of the top head and a second mating annular flange 214 disposed on the upper end or top of the shell. The flanged joint 210 may be a bolted joint, which optionally may further be seal welded after assembly with a circumferentially extending annular seal weld being made between the adjoining flanges 212 and 214.

The top head 206 of containment vessel 200 may be an ASME (American Society of Mechanical Engineers) dome-shaped flanged and dished head to add structural strength (i.e. internal pressure retention and external impact resistance); however, other possible configurations including a flat top head might be used. The bottom head 208 may similarly be a dome-shaped dished head or alternatively flat in other possible embodiments. In one containment vessel construction, the bottom head 208 may be directly welded to the lower portion or end of the shell 204 via an integral straight flange (SF) portion of the head matching the diameter of shell. In one embodiment, the bottom of the containment vessel 200 may include a ribbed support stand 208a or similar structure attached to the bottom head 208 to help stabilize and provide level support for the containment vessel on the slab 302 of the foundation 301, as further described herein.

In some embodiments, the top portion 216 of the containment vessel shell 204 may be a diametrically enlarged segment of the shell that forms a housing to support and accommodate a polar crane (not shown) for moving equipment, fuel, etc. inside the containment vessel. This will provide crane access to the very inside periphery of the containment vessel and enable placement of equipment very close to the periphery of the containment vessel 200 making the containment vessel structure compact. In one configuration, therefore, the above grade portion of the containment vessel 200 may resemble a mushroom-shaped structure.

In one possible embodiment, the enlarged top portion 216 of containment vessel 200 may have an outer diameter D2 that is larger than the outer diameter D1 of the rest of the adjoining lower portion 218 of the containment vessel shell 204. In one non-limiting example, the top portion 216 may have a diameter D2 that is approximately 10 feet larger than the diameter D1 of the lower portion 218 of the shell 204. The top portion 216 of shell 204 may have a suitable height H2 selected to accommodate the polar crane with allowance for working clearances which may be less than 50% of the total height H1 of the containment vessel 200. In one non-limiting example, approximately the top ten feet of the containment vessel 200 (H2) may be formed by the enlarged diameter top portion 216 in comparison to a total height H1 of 200 feet of the containment vessel. The top portion 216 of containment vessel 200 may terminate at the upper end with flange 214 at the flanged connection to the top head 206 of the containment vessel.

Figure 4:
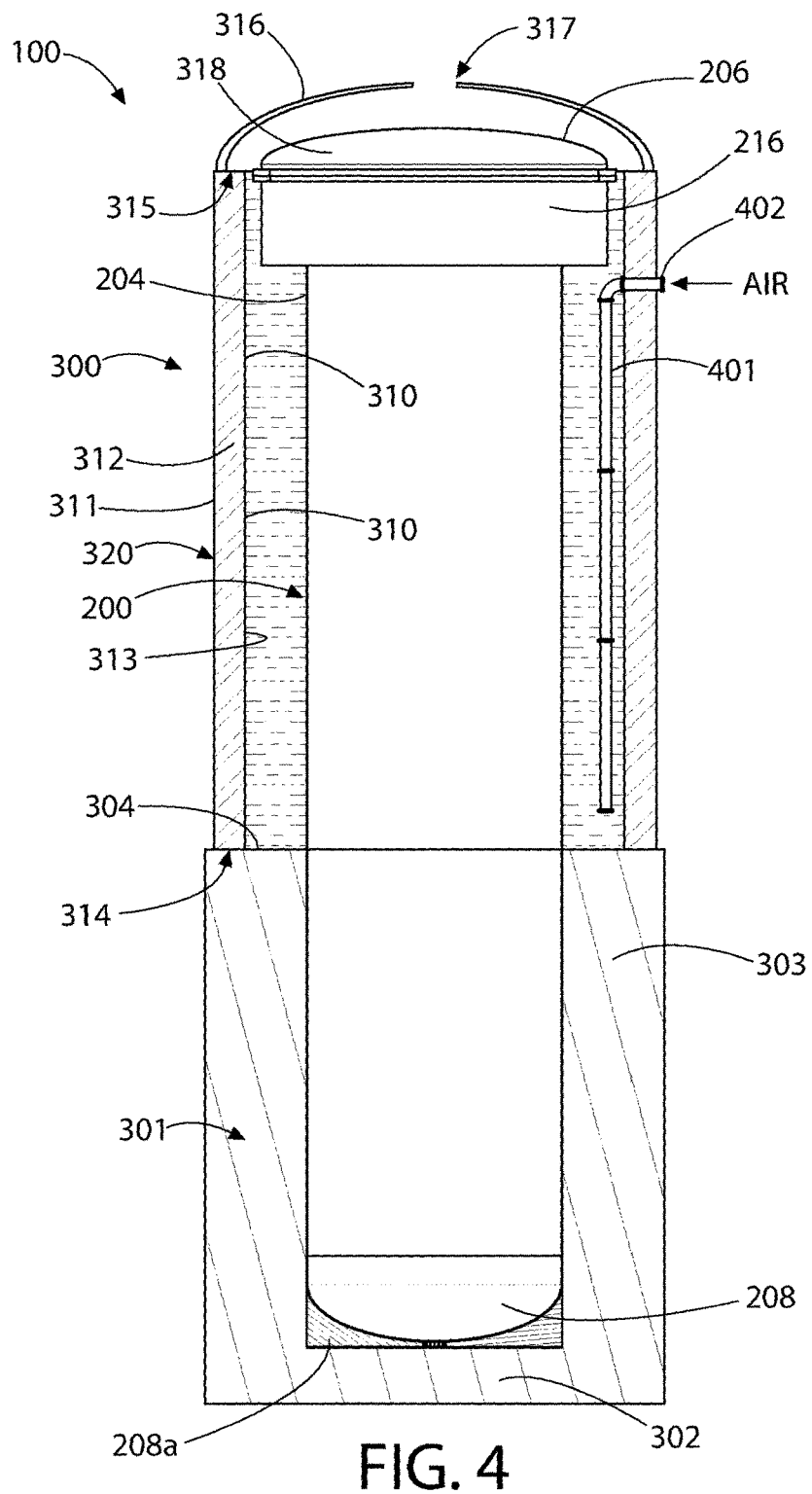
FIG. 4 is a longitudinal cross-sectional view of the nuclear reactor containment system showing the containment vessel of FIG. 1 and outer containment enclosure structure (CES) with water filled annular reservoir formed between the vessel and enclosure.

In one embodiment, the diametrically enlarged top portion 216 of containment vessel 200 has a diameter D2 which is smaller than the inside diameter D3 of the containment enclosure structure (CES) 300 to provide a (substantially) radial gap or secondary annulus 330 (see, e.g. FIG. 4). This provides a cushion of space or buffer region between the containment enclosure structure (CES) 300 and containment vessel top portion 216 in the advent of a projectile impact on the containment enclosure structure (CES). Furthermore, the annulus 330 further significantly creates a flow path between primary annulus 313 (between the shells of the containment enclosure structure (CES) 300 and containment vessel 200) and the head space 318 between the containment enclosure structure (CES) dome 316 and top head 206 of the containment vessel 200 for steam and/or air to be vented from the containment enclosure structure (CES) as further described herein. Accordingly, the secondary annulus 330 is in fluid communication with the primary annulus 313 and the head space 318 which in turn is in fluid communication with vent 317 which penetrates the dome 316. In one embodiment, the secondary annulus 330 has a smaller (substantially) radial width than the primary annulus 313.

Referring to FIGS. 1-4, the containment enclosure structure (CES) 300 may be double-walled structure in some embodiments having sidewalls 320 formed by two (substantially) radially spaced and interconnected concentric shells 310 (inner) and 311(outer) with plain or reinforced concrete 312 installed in the annular space between them. The concentric shells 310, 311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure structure (CES) 300 may have a concrete 312 thickness of 6 feet or more which ensures adequate ability to withstand high energy projectile impacts such as that from an airliner.

The containment enclosure structure (CES) 300 circumscribes the containment vessel shell 204 and is spaced (substantially) radially apart from shell 204, thereby creating primary annulus 313. Annulus 313 may be a water-filled in one embodiment to create a heat sink for receiving and dissipating heat from the containment vessel 200 in the case of a thermal energy release incident inside the containment vessel. This water-filled annular reservoir preferably extends circumferentially for a full 360 degrees in one embodiment around the perimeter of upper portions of the containment vessel shell 204 lying above the concrete foundation 301. FIG. 4 shows a cross-section of the water-filled annulus 313 without the external (substantially) radial fins 221 in this figure for clarity. In one embodiment, the annulus 313 is filled with water from the base mat 304 at the bottom end 314 to approximately the top end 315 of the concentric shells 310, 311 of the containment enclosure structure (CES) 300 to form an annular cooling water reservoir between the containment vessel shell 204 and inner shell 310 of the containment enclosure structure (CES). This annular reservoir may be coated or lined in some embodiments with a suitable corrosion resistant material such as aluminum, stainless steel, or a suitable preservative for corrosion protection. In one representative example, without limitation, the annulus 313 may be about 10 feet wide and about 100 feet high.

In one embodiment, the containment enclosure structure (CES) 300 includes a steel dome 316 that is suitably thick and reinforced to harden it against crashing aircraft and other incident projectiles. The dome 316 may be removably fastened to the shells 310, 311 by a robust flanged joint 318. In one embodiment, the containment enclosure structure (CES) 300 is entirely surrounded on all exposed above grade portions by the containment enclosure structure (CES) 300, which preferably is sufficiently tall to provide protection for the containment vessel against aircraft hazard or comparable projectile to preserve the structural integrity of the water mass in the annulus 313 surrounding the containment vessel. In one embodiment, as shown, the containment enclosure structure (CES) 300 extends vertically below grade to a substantial portion of the distance to the top of the base mat 304.

The containment enclosure structure (CES) 300 may further include at least one rain-protected vent 317 which is in fluid communication with the head space 318 beneath the dome 316 and water-filled annulus 313 to allow water vapor to flow, escape, and vent to atmosphere. In one embodiment, the vent 317 may be located at the center of the dome 316. In other embodiments, a plurality of vents may be provided spaced (substantially) radially around the dome 316. The vent 317 may be formed by a short section of piping in some embodiments which is covered by a rain hood of any suitable configuration that allows steam to escape from the containment enclosure structure (CES) but minimizes the ingress of water.

In some possible embodiments, the head space 318 between the dome 316 and top head 206 of the containment vessel 200 may be filled with an energy absorbing material or structure to minimize the impact load on the containment enclosure structure (CES) dome 316 from a crashing (falling) projecting (e.g. airliner, etc.). In one example, a plurality of tightly-packed undulating or corrugated deformable aluminum plates may be disposed in part or all of the head space to form a crumple zone which will help absorb and dissipate the impact forces on the dome 316.

Referring primarily to FIGS. 1-5 and 8-17, the buried portions of the containment vessel 200 within the concrete foundation 301 below the base mat 304 may have a plain shell 204 without external features. Portions of the containment vessel shell 204 above the base mat 304, however, may include a plurality of longitudinal external (substantially) radial ribs or fins 220 which extend axially (substantially) parallel to vertical axis VA of the containment vessel-enclosure assembly 200-300. The external longitudinal fins 220 are spaced circumferentially around the perimeter of the containment vessel shell 204 and extend (substantially) radially outwards from the containment vessel.

The ribs 220 serve multiple advantageous functions including without limitation (1) to stiffen the containment vessel shell 204, (2) prevent excessive "sloshing" of water reserve in annulus 313 in the occurrence of a seismic event, and (3) significantly to act as heat transfer "fins" to dissipate heat absorbed by conduction through the shell 204 to the environment of the annulus 313 in the situation of a fluid/steam release event in the containment vessel.

Accordingly, in one embodiment to maximize the heat transfer effectiveness, the longitudinal fins 220 extend vertically for substantially the entire height of the water-filled annulus 313 covering the effective heat transfer surfaces of the containment vessel 200 (i.e. portions not buried in concrete foundation) to transfer heat from the containment vessel 200 to the water reservoir, as further described herein. In one embodiment, the external longitudinal fins 220 have upper horizontal ends 220a which terminate at or proximate to the underside or bottom of the larger diameter top portion 216 of the containment vessel 200, and lower horizontal ends 220b which terminate at or proximate to the base mat 304 of the concrete foundation 301. In one embodiment, the external longitudinal fins 220 may have a height H3 which is equal to or greater than one half of a total height of the shell of the containment vessel.

In one embodiment, the upper horizontal ends 220a of the longitudinal fins 220 are free ends not permanently attached (e.g. welded) to the containment vessel 200 or other structure. At least part of the lower horizontal ends 220b of the longitudinal fins 220 may abuttingly contact and rest on a horizontal circumferential rib 222 welded to the exterior surface of the containment vessel shell 204 to help support the weight of the longitudinal fins 220 and minimize stresses on the longitudinal rib-to-shell welds. Circumferential rib 222 is annular in shape and may extend a full 360 degrees completely around the circumferential of the containment vessel shell 204. In one embodiment, the circumferential rib 222 is located to rest on the base mat 304 of the concrete foundation 301 which transfers the loads of the longitudinal fins 220 to the foundation. The longitudinal fins 220 may have a lateral extent or width that projects outwards beyond the outer peripheral edge of the circumferential rib 222. Accordingly, in this embodiment, only the inner portions of the lower horizontal end 220b of each rib 220 contacts the circumferential rib 222. In other possible embodiments, the circumferential rib 222 may extend (substantially) radially outwards far enough so that substantially the entire lower horizontal end 220b of each longitudinal rib 220 rests on the circumferential rib 222. The lower horizontal ends 220b may be welded to the circumferential rib 222 in some embodiments to further strengthen and stiffen the longitudinal fins 220.

The external longitudinal fins 220 may be made of steel (e.g. low carbon steel), or other suitable metallic materials including alloys which are each welded on one of the longitudinally-extending sides to the exterior of the containment vessel shell 204. The opposing longitudinally-extending side of each rib 220 lies proximate to, but is preferably not permanently affixed to the interior of the inner shell 310 of the containment enclosure structure (CES) 300 to maximize the heat transfer surface of the ribs acting as heat dissipation fins. In one embodiment, the external longitudinal fins 220 extend (substantially) radially outwards beyond the larger diameter top portion 216 of the containment vessel 200 as shown. In one representative example, without limitation, steel ribs 220 may have a thickness of about 1 inch. Other suitable thickness of ribs may be used as appropriate. Accordingly, in some embodiments, the ribs 220 have a radial width that is more than 10 times the thickness of the ribs.

Figure 2:
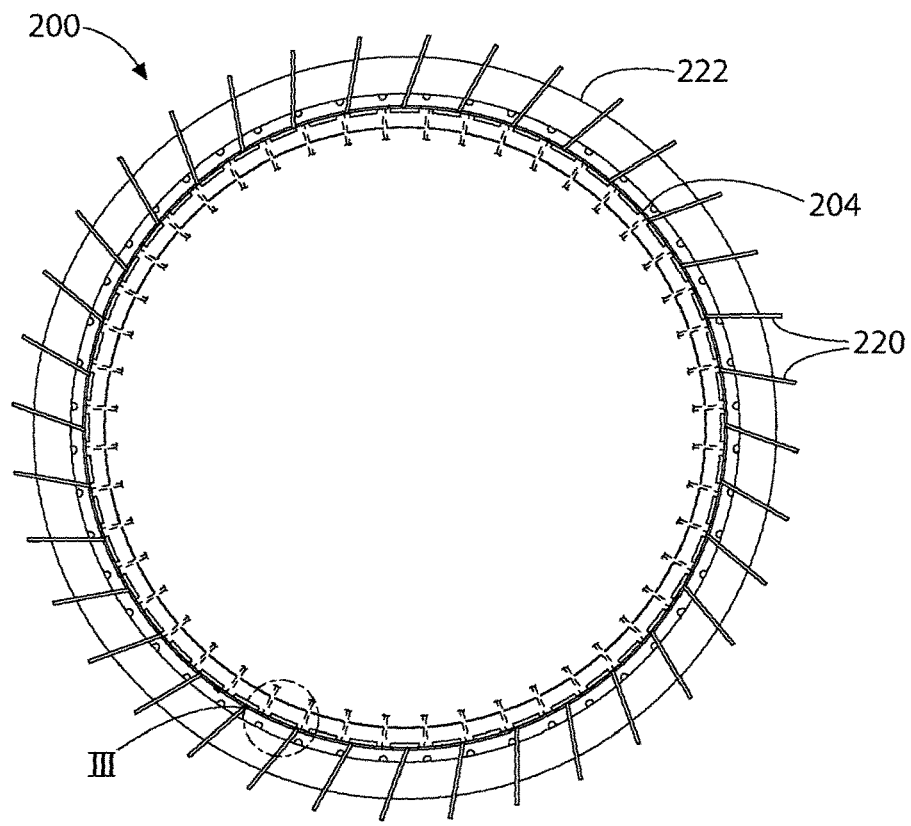
FIG. 2 is transverse cross-sectional view thereof taken along line II-II.
Figure 3:
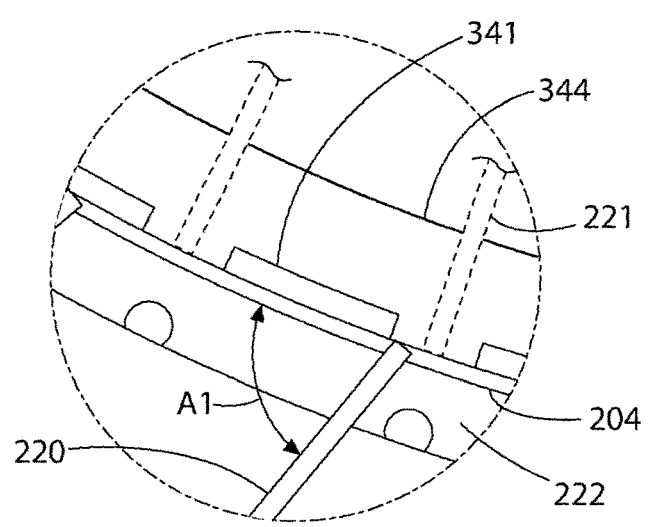
FIG. 3 is a detail of item III in FIG. 2.
Figure 5:
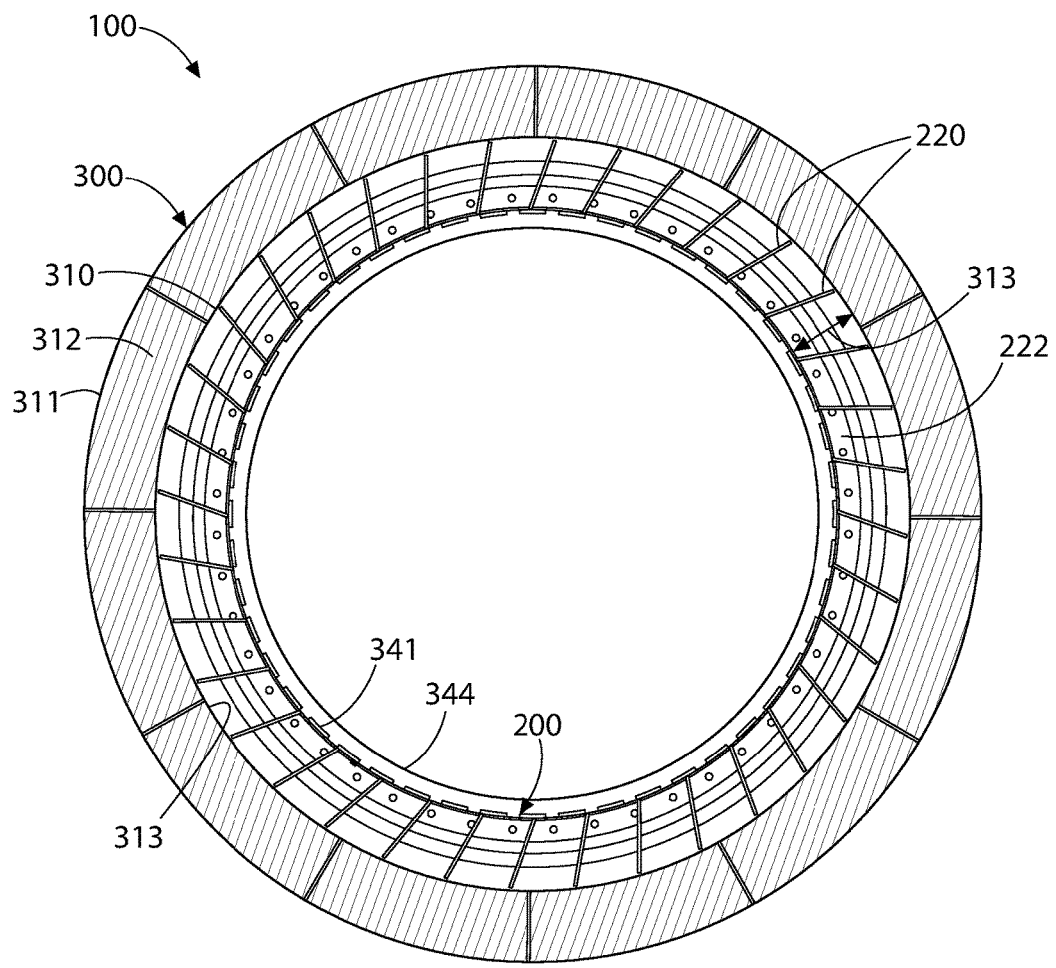
FIG. 5 is a longitudinal cross-sectional view through the containment vessel and containment enclosure structure (CES)

In one embodiment, the longitudinal fins 220 are oriented at an oblique angle Al to containment vessel shell 204 as best shown in FIGS. 2-3 and 5. This orientation forms a crumple zone extending 360 degrees around the circumference of the containment vessel 200 to better resist projectile impacts functioning in cooperation with the outer containment enclosure structure (CES) 300. Accordingly, an impact causing inward deformation of the containment enclosure structure (CES) shells 210, 211 will bend the longitudinal fins 220 which in the process will distribute the impact forces preferably without direct transfer to and rupturing of the inner containment vessel shell 204 as might possibly occur with ribs oriented 90 degrees to the containment vessel shell 204. In other possible embodiments, depending on the construction of the containment enclosure structure (CES) 300 and other factors, a perpendicular arrangement of ribs 220 to the containment vessel shell 204 may be appropriate.

In one embodiment, referring to FIGS. 6-8, portions of the containment vessel shell 204 having and protected by the external (substantially) radial fins 220 against projectile impacts may extend below grade to provide protection against projectile strikes at or slightly below grade on the containment enclosure structure (CES) 300. Accordingly, the base mat 304 formed at the top of the vertically extending sidewalls 303 of the foundation 301 where the fins 220 terminate at their lower ends may be positioned a number of feet below grade to improve impact resistance of the nuclear reactor containment system.

In one embodiment, the containment vessel 200 may optionally include a plurality of circumferentially spaced apart internal (substantially) radial fins 221 attached to the interior surface of the shell 204 (shown as dashed in FIGS. 2 and 3). Internal fins 221 extend (substantially) radially inwards from containment vessel shell 204 and longitudinally in a vertical direction of a suitable height. In one embodiment, the internal (substantially) radial fins 221 may have a height substantially coextensive with the height of the water-filled annulus 313 and extend from the base mat 304 to approximately the top of the shell 204. In one embodiment, without limitation, the internal fins 221 may be oriented substantially perpendicular (i.e. 90 degrees) to the containment vessel shell 204. Other suitable angles and oblique orientations may be used. The internal fins function to both increase the available heat transfer surface area and structurally reinforce the containment vessel shell against external impact (e.g. projectiles) or internal pressure increase within the containment vessel 200 in the event of a containment pressurization event (e.g. LOCA or reactor scram). In one embodiment, without limitation, the internal fins 221 may be made of steel.

Referring to FIGS. 1-15, a plurality of vertical structural support columns 331 may be attached to the exterior surface of the containment vessel shell 204 to help support the diametrically larger top portion 216 of containment vessel 200 which has peripheral sides that are cantilevered (substantially) radially outwards beyond the shell 204. The support columns 331 are spaced circumferentially apart around the perimeter of containment vessel shell 204. In one embodiment, the support columns 331 may be formed of steel hollow structural members, for example without limitation C-shaped members in cross-section (i.e. structural channels), which are welded to the exterior surface of containment vessel shell 204. The two parallel legs of the channels may be vertically welded to the containment vessel shell 204 along the height of each support column 331 using either continuous or intermittent welds such as stitch welds.

The support columns 331 extend vertically downwards from and may be welded at their top ends to the bottom/underside of the larger diameter top portion 216 of containment vessel housing the polar crane. The bottom ends of the support columns 331 rest on or are welded to the circumferential rib 222 which engages the base mat 304 of the concrete foundation 301 near the buried portion of the containment. The columns 331 help transfer part of the dead load or weight from the crane and the top portion 216 of the containment vessel 300 down to the foundation. In one embodiment, the hollow space inside the support columns may be filled with concrete (with or without rebar) to help stiffen and further support the dead load or weight. In other possible embodiments, other structural steel shapes including filled or unfilled box beams, I-beams, tubular, angles, etc. may be used. The longitudinal fins 220 may extend farther outwards in a (substantially) radial direction than the support columns 331 which serve a structural role rather than a heat transfer role as the ribs 220. In certain embodiments, the ribs 220 have a (substantially) radial width that is at least twice the (substantially) radial width of support columns.

FIGS. 11-15 show various cross sections (both longitudinal and transverse) of containment vessel 200 with equipment shown therein. In one embodiment, the containment vessel 200 may be part of a small modular reactor (SMR) system such as SMR-160 by Holtec International. The equipment may generally include a nuclear reactor vessel 500 disposed in a wet well 504 and defining an interior space housing a nuclear fuel core inside and circulating primary coolant, and a steam generator 502 fluidly coupled to the reactor and circulating a secondary coolant which may form part of a Rankine power generation cycle. Such a system is described for example in PCT International Patent Application No. PCT/US13/66777 filed Oct. 25, 2013, which is incorporated herein by reference in its entirety. Other appurtenances and equipment may be provided to create a complete steam generation system.

Auxiliary Heat Dissipation System

Referring primarily now to FIGS. 2-3, 16, and 18, the containment vessel 200 may further include an auxiliary heat dissipation system 340 comprising a discrete set or array of heat dissipater ducts 610 (HDD). In one embodiment, the auxiliary heat dissipation system 340 and associated heat dissipater ducts 610 may form part of a passive reactor core cooling system described in further detail below and shown in FIGS. 22 and 23.

Heat dissipater ducts 610 include a plurality of internal longitudinal ducts 341 (i.e. flow conduits) circumferentially spaced around the circumference of containment vessel shell 204. Ducts 341 extend vertically parallel to the vertical axis VA and in one embodiment are attached to the interior surface of shell 204. The ducts 341 may be made of metal such as steel and are welded to interior of the shell 204. In one possible configuration, without limitation, the ducts 341 may be comprised of vertically oriented C-shaped structural channels (in cross section) or half-sections of pipe/tube positioned so that the parallel legs of the channels or pipe/tubes are each seam welded to the shell 204 for their entire height to define a sealed vertical flow conduit. The fluid (liquid or steam phase) in the heat dissipater ducts in this embodiment therefore directly contacts the reactor containment vessel 200 to maximize heat transfer through the vessel to the water in the annular reservoir (primary annulus 313) which forms a heat sink for the reactor containment vessel 200 and the heat dissipater ducts. Other suitably shaped and configured heat dissipater ducts 341 may be provided for this type construction so long as the fluid conveyed in the ducts contacts at least a portion of the interior containment vessel shell 204 to transfer heat to the water-filled annulus 313.

In other possible but less preferred acceptable embodiments, the heat dissipater ducts 341 may be formed from completely tubular walled flow conduits (e.g. full circumferential tube or pipe sections rather than half sections) which are welded to the interior containment vessel shell 204. In these type constructions, the fluid conveyed in the ducts 341 will transfer heat indirectly to the reactor containment vessel shell 204 through the wall of the ducts first, and then to the water-filled annulus 313.

Any suitable number and arrangement of ducts 341 may be provided depending on the heat transfer surface area required for cooling the fluid flowing through the ducts. The ducts 341 may be uniformly or non-uniformly spaced on the interior of the containment vessel shell 204, and in some embodiments grouped clusters of ducts may be circumferentially distributed around the containment vessel. The ducts 341 may have any suitable cross-sectional dimensions depending on the flow rate of fluid carried by the ducts and heat transfer considerations.

The open upper and lower ends 341a, 341b of the ducts 341 are each fluidly connected to a common upper inlet ring header 343 and lower outlet ring header 344. The annular shaped ring headers 343, 344 are vertically spaced apart and positioned at suitable elevations on the interior of the containment vessel 200 to maximize the transfer of heat between fluid flowing vertically inside ducts 341 and the shell 204 of the containment vessel in the active heat transfer zone defined by portions of the containment vessel having the external longitudinal fins 220 in the primary annulus 313. To take advantage of the primary water-filled annulus 313 for heat transfer, upper and lower ring headers 343, 344 may each respectively be located on the interior of the containment vessel shell 204 adjacent and near to the top and bottom of the annulus.

In one embodiment, the ring headers 343, 344 may each be formed of half-sections of arcuately curved steel pipe as shown which are welded directly to the interior surface of containment vessel shell 204 in the manner shown. In other embodiments, the ring headers 343, 344 may be formed of complete sections of arcuately curved piping supported by and attached to the interior of the shell 204 by any suitable means.

In one embodiment, the heat dissipation system 340 is fluidly connected to a source of steam that may be generated from a water mass inside the containment vessel 200 to reject radioactive material decay heat from the reactor core. The containment surface enclosed by the ducts 341 serves as the heat transfer surface to transmit the latent heat of the steam inside the ducts to the shell 204 of the containment vessel 200 for cooling via the external longitudinal fins 220 and water filled annulus 313. In operation, steam enters the inlet ring header 343 and is distributed to the open inlet ends of the ducts 341 penetrating the header. The steam enters the ducts 341 and flows downwards therein along the height of the containment vessel shell 204 interior and undergoes a phase change from steam (vapor) to liquid. The condensed steam drains down by gravity in the ducts and is collected by the lower ring header 344 from which it is returned back to the source of steam also preferably by gravity in one embodiment. It should be noted that no pumps are involved or required in the foregoing process.

It will be appreciated that in certain embodiments, more than one set or array of heat dissipater ducts 610 may be provided and arranged on the inside surface of the inner containment vessel 200 within the containment space defined by the vessel.

Auxiliary Air Cooling System

According to another aspect of the present disclosure, a secondary or backup passive air cooling system 400 is provided to initiate air cooling by natural convection of the containment vessel 200 if, for some reason, the water inventory in the primary annulus 313 were to be depleted during a thermal reactor related event (e.g. LOCA or reactor scram). Referring to FIG. 8, the air cooling system 400 may be comprised of a plurality of vertical inlet air conduits 401 spaced circumferentially around the containment vessel 200 in the primary annulus 313. Each air conduit 401 includes an inlet 402 which penetrates the sidewalls 320 of the containment enclosure structure (CES) 300 and is open to the atmosphere outside to draw in ambient cooling air. Inlets 402 are preferably positioned near the upper end of the containment enclosure structure's sidewalls 320. The air conduits 401 extend vertically downwards inside the annulus 313 and terminate a short distance above the base mat 304 of the foundation (e.g. approximately 1 foot) to allow air to escape from the open bottom ends of the conduits.

Using the air conduits 401, a natural convection cooling airflow pathway is established in cooperation with the annulus 313. In the event the cooling water inventory in the primary annulus 313 is depleted by evaporation during a thermal event, air cooling automatically initiates by natural convection as the air inside the annulus will continue to be heated by the containment vessel 200. The heated air rises in the primary annulus 313, passes through the secondary annulus 330, enters the head space 318, and exits the dome 316 of the containment enclosure structure (CES) 300 through the vent 317 (see directional flow arrows, FIG. 8). The rising heated air creates a reduction in air pressure towards the bottom of the primary annulus 313 sufficient to draw in outside ambient downwards through the air conduits 401 thereby creating a natural air circulation pattern which continues to cool the heated containment vessel 200. Advantageously, this passive air cooling system and circulation may continue for an indefinite period of time to cool the containment vessel 200.

It should be noted that the primary annulus 313 acts as the ultimate heat sink for the heat generated inside the containment vessel 200. The water in this annular reservoir also acts to maintain the temperature of all crane vertical support columns 331 (described earlier) at essentially the same temperature thus ensuring the levelness of the crane rails (not shown) at all times which are mounted in the larger portion 216 of the containment vessel 200.

Figure 19:
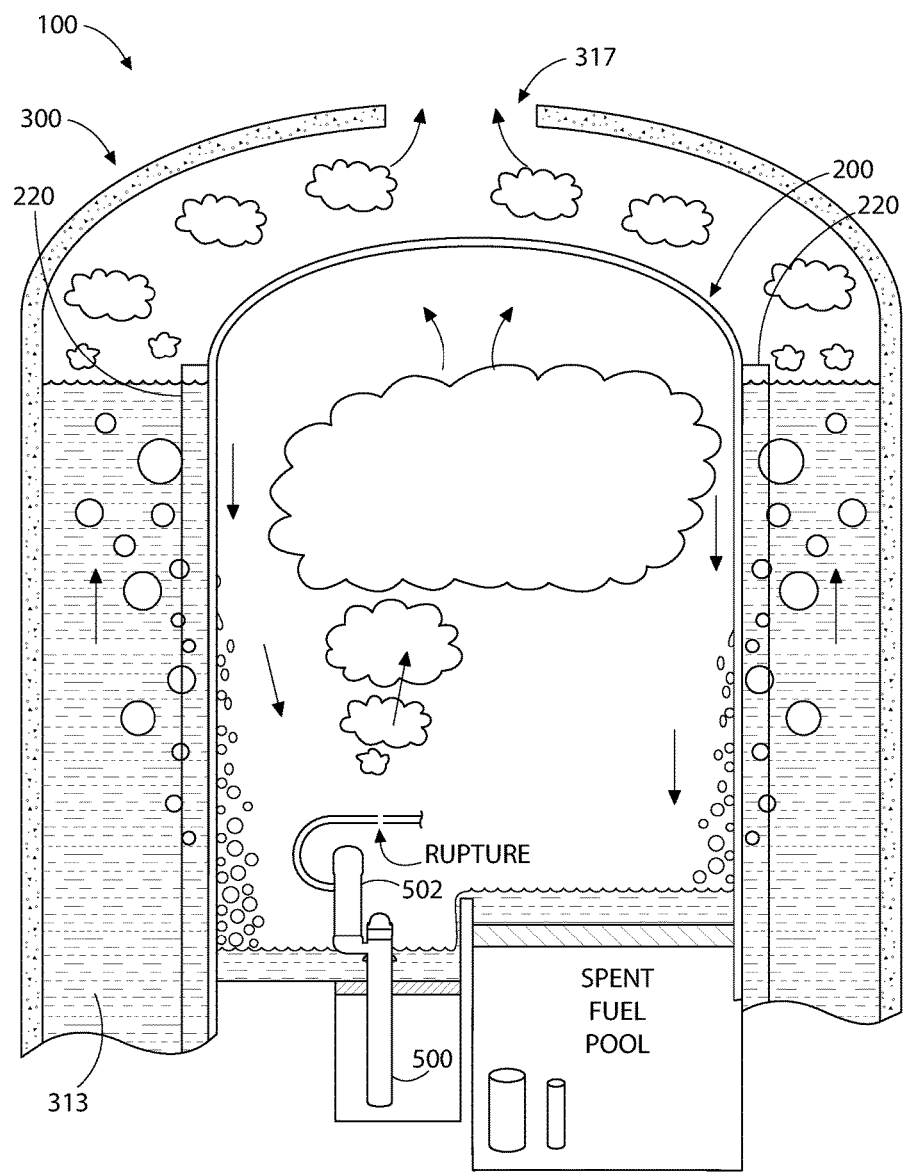
FIG. 19 is a schematic depiction of a generalized cross-section of the nuclear reactor containment system and operation of the water filled annular reservoir to dissipate heat and cool the containment vessel during a thermal energy release event.
Figure 20:
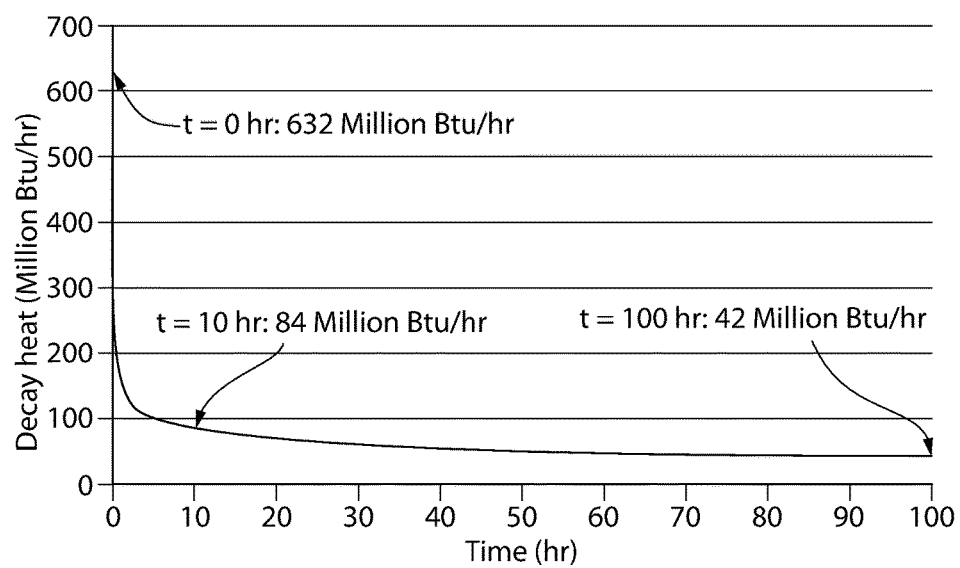
FIG. 20 is a graph showing a typical heat generation curve of a light water reactor subsequent to a scram event.

Operation of the reactor containment system 100 as a heat exchanger will now be briefly described with initial reference to FIG. 19. This figure is a simplified diagrammatic representation of the reactor containment system 100 without all of the appurtenances and structures described herein for clarity in describing the active heat transfer and rejection processes performed by the system.

In the event of a loss-of-coolant (LOCA) accident, the high energy fluid or liquid coolant (which may typically be water) spills into the containment environment formed by the containment vessel 200. The liquid flashes instantaneously into steam and the vapor mixes with the air inside the containment and migrates to the inside surface of the containment vessel 200 sidewalls or shell 204 (since the shell of the containment is cooler due the water in the annulus 313). The vapor then condenses on the vertical shell walls by losing its latent heat to the containment structure metal which in turn rejects the heat to the water in the annulus 313 through the longitudinal fins 220 and exposed portions of the shell 204 inside the annulus. The water in the annulus 313 heats up and eventually evaporates forming a vapor which rises in the annulus and leaves the containment enclosure structure (CES) 300 through the secondary annulus 330, head space 318, and finally the vent 317 to atmosphere.

As the water reservoir in annulus 313 is located outside the containment vessel environment, in some embodiments the water inventory may be easily replenished using external means if available to compensate for the evaporative loss of water. However, if no replenishment water is provided or available, then the height of the water column in the annulus 313 will begin to drop. As the water level in the annulus 313 drops, the containment vessel 200 also starts to heat the air in the annulus above the water level, thereby rejecting a portion of the heat to the air which rises and is vented from the containment enclosure structure (CES) 300 through vent 317 with the water vapor. When the water level drops sufficiently such that the open bottom ends of the air conduits 401 (see, e.g. FIG. 8) become exposed above the water line, fresh outside ambient air will then be pulled in from the air conduits 401 as described above to initiate a natural convection air circulation pattern that continues cooling the containment vessel 200.

In one embodiment, provisions (e.g. water inlet line) are provided through the containment enclosure structure (CES) 300 for water replenishment in the annulus 313 although this is not required to insure adequate heat dissipation. The mass of water inventory in this annular reservoir is sized such that the decay heat produced in the containment vessel 200 has declined sufficiently such that the containment is capable of rejecting all its heat through air cooling alone once the water inventory is depleted. The containment vessel 200 preferably has sufficient heat rejection capability to limit the pressure and temperature of the vapor mix inside the containment vessel (within its design limits) by rejecting the thermal energy rapidly.

Figure 16:
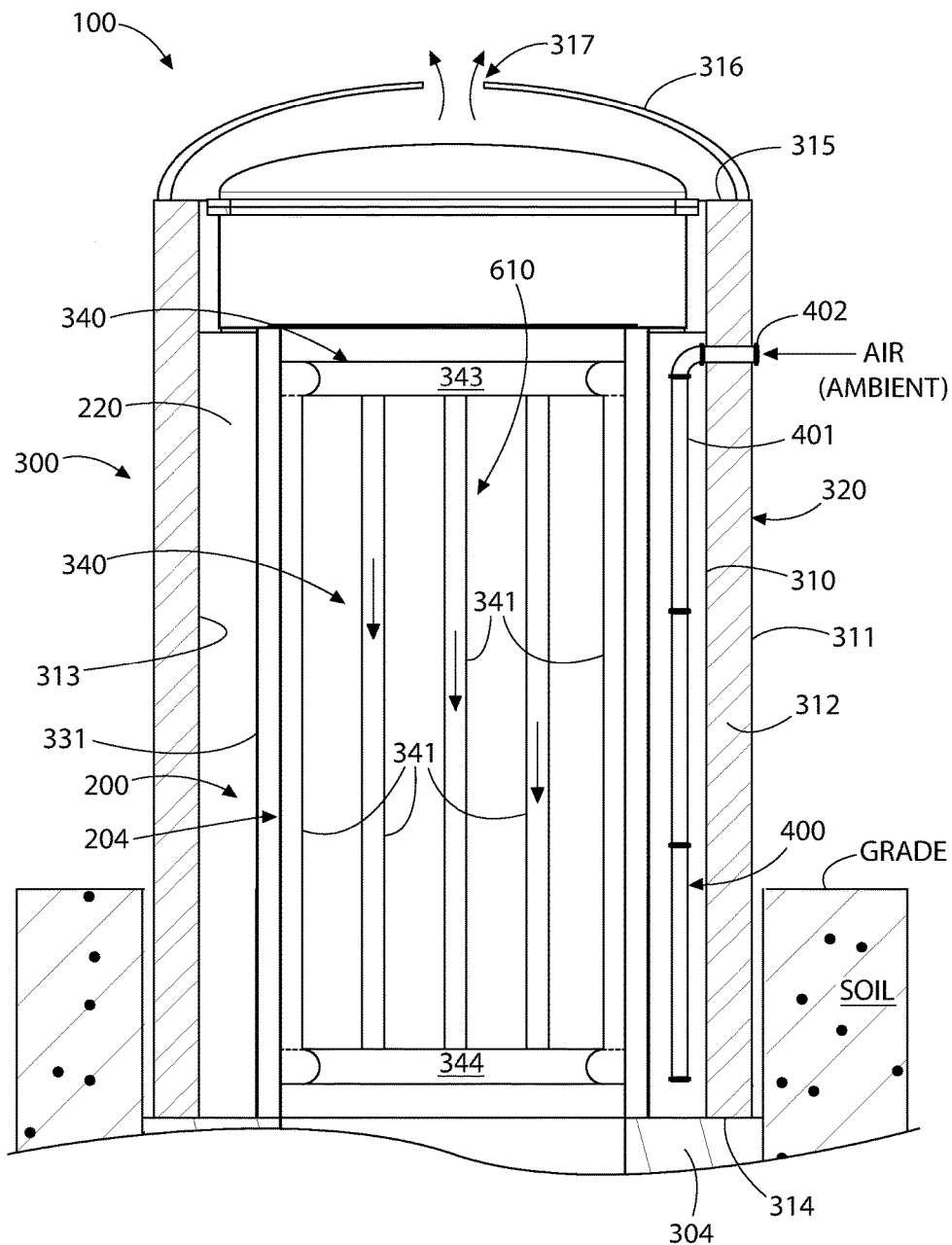
FIG. 16 is a partial longitudinal cross-sectional view of the nuclear reactor containment system showing an auxiliary heat dissipation system.
Figure 17:
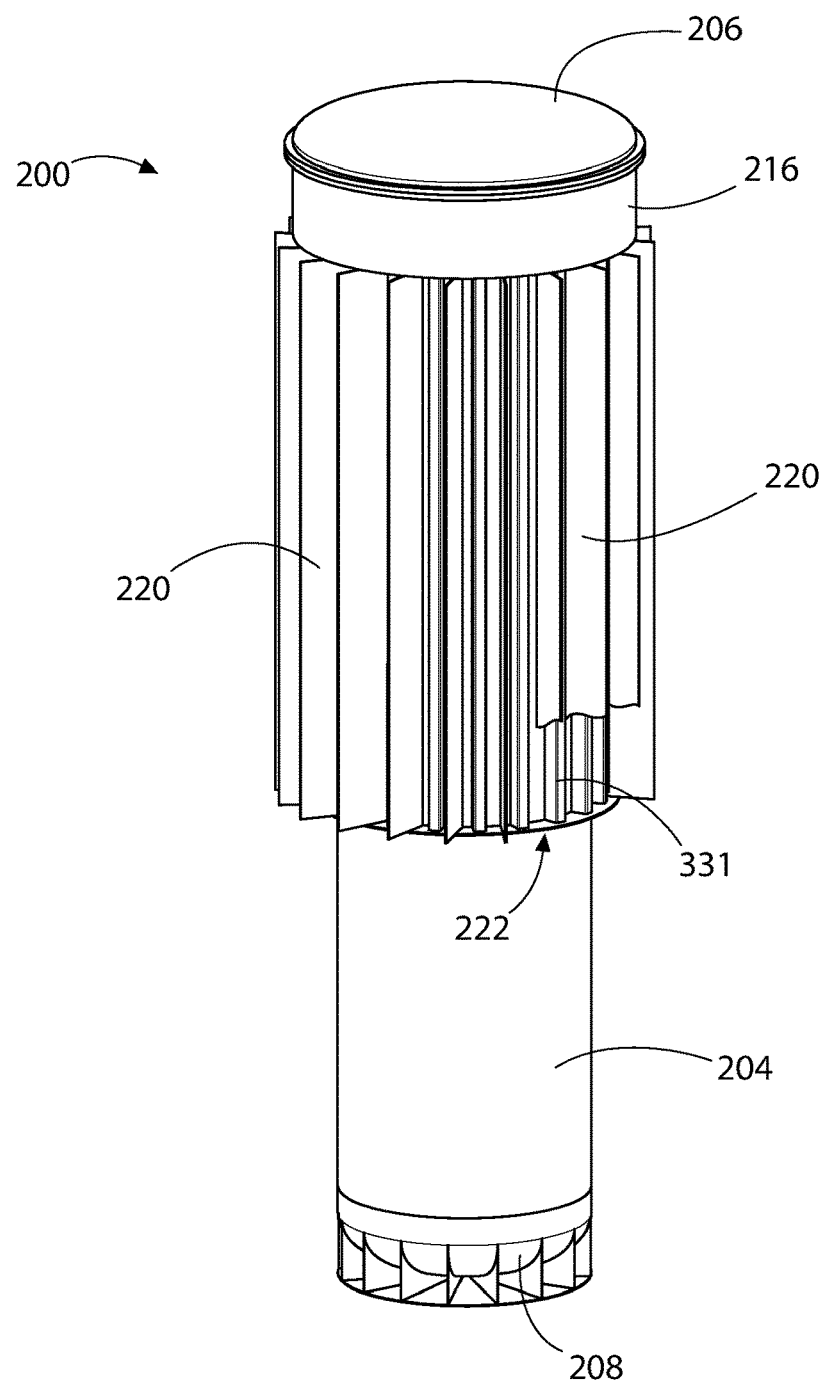
FIG. 17 is an isometric view of the containment vessel with lower portions of the (substantially) radial fins of the containment vessel broken away in part to reveal vertical support columns and circumferential rib.
Figure 18:
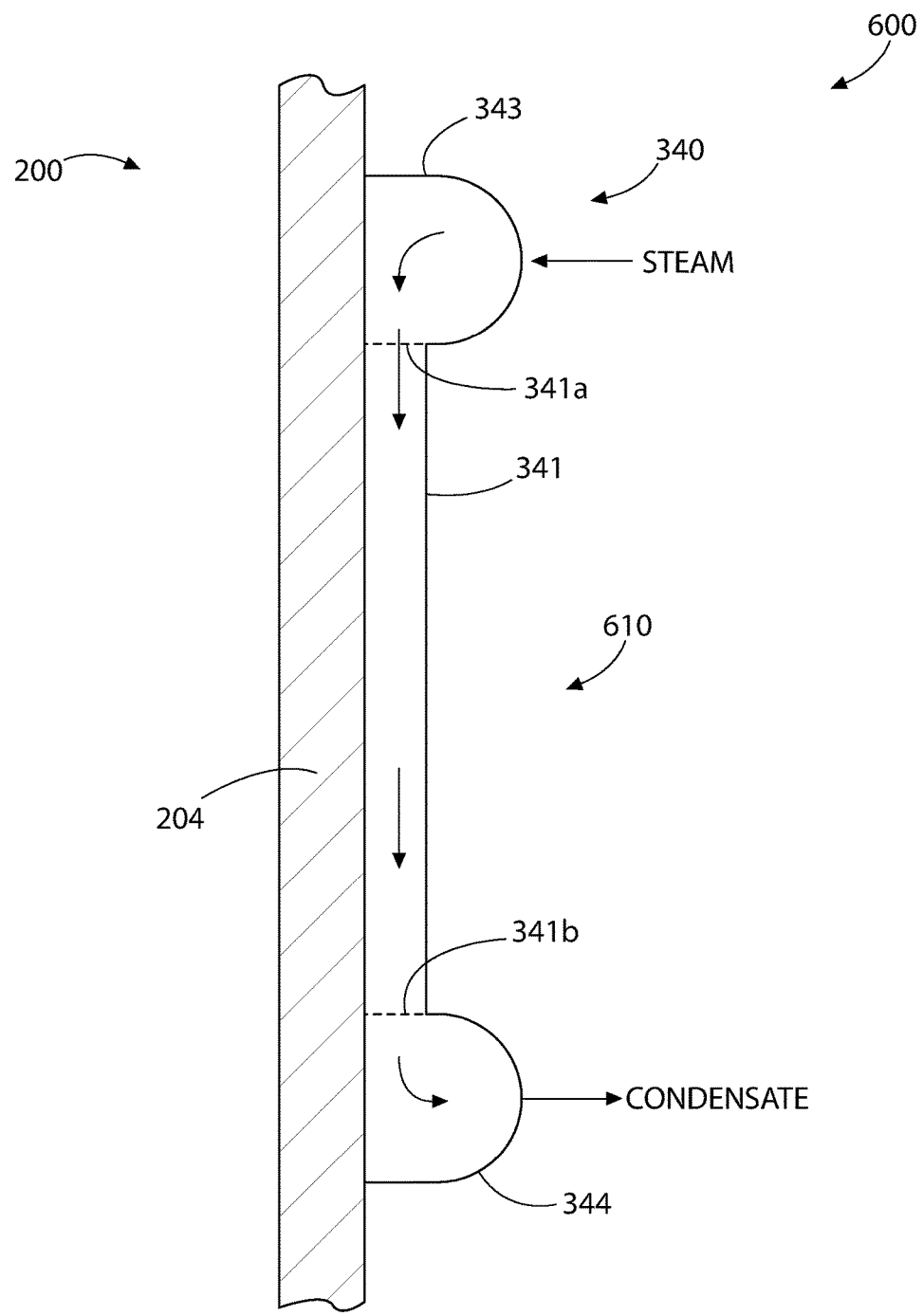
FIG. 18 is a longitudinal cross-sectional view of a portion of the heat dissipation system of FIG. 16 showing upper and lower ring headers and ducts attached to the shell of the containment vessel.

In the event of a station blackout, the reactor core is forced into a "scram" and the passive core cooling systems will reject the decay heat of the core in the form of steam directed to upper inlet ring header 343 of heat dissipation system 340 already described herein (see, e.g. FIGS. 16 and 18). The steam then flowing downwards through the network of internal longitudinal ducts 341 comes in contact with the containment vessel shell 204 interior surface enclosed within the heat dissipation ducts and condenses by rejecting its latent heat to the containment structure metal, which in turn rejects the heat to the water in the annulus via heat transfer assistance provide by the longitudinal fins 220. The water in the annular reservoir (primary annulus 313) heats up eventually evaporating. The containment vessel 200 rejects the heat to the annulus by sensible heating and then by a combination of evaporation and air cooling, and then further eventually by natural convection air cooling only as described herein. As mentioned above, the reactor containment system 100 is designed and configured so that air cooling alone is sufficient to reject the decay heat once the effective water inventory in annulus 313 is entirely depleted.

In both these foregoing scenarios, the heat rejection can continue indefinitely until alternate means are available to bring the plant back online. Not only does the system operate indefinitely, but the operation is entirely passive without the use of any pumps or operator intervention.

Passive Reactor Cooling System

According to another aspect of the invention, a passive gravity-driven nuclear reactor cooling system is provided to reject the reactor's decay heat during a reactor shutdown (e.g. "scram") without any reliance on and drawbacks of pumps and motors. In one embodiment, a passive nuclear reactor shutdown cooling system 600 may comprise a submerged bundle cooling system 602 (SBCS) including components generally shown in FIGS. 21-23.

The submerged bundle cooling system 602 is preferably a closed loop pressurized flow system comprised of three major parts or sub-systems, namely (i) a submerged bundle heat exchanger 620 (SBHX), (ii) a discrete set or array of heat dissipater ducts 610 (HDD) integrally connected to the inner wall of the containment structure (described in detail above), and (iii) the steam generator 502 with superheater or reactor pressure vessel 500 as further described herein. Steam and condensate flow paths are established between these components as described below. The submerged bundle cooling system 602 is configured to utilize the secondary steam in the steam generator to extract the thermal energy generated by the fuel core in a closed loop process during a reactor shutdown that can continue indefinitely in the absence of a ready source of electric power.

Steam generator 502 is more fully described in International PCT Application No. PCT/US13/38289 filed Apr. 25, 2013, which is incorporated herein by reference in its entirety. As described therein and shown in FIGS. 11, 12, and 24 of the present application, the steam generator 502 may be vertically oriented and axially elongated similarly to submerged bundle heat exchanger 620. The steam generator 502 may be comprised of a set of tubular heat exchangers arranged in a vertical stack configured to extract the reactor's decay heat from the primary coolant by gravity-driven passive flow means.

Figure 24:
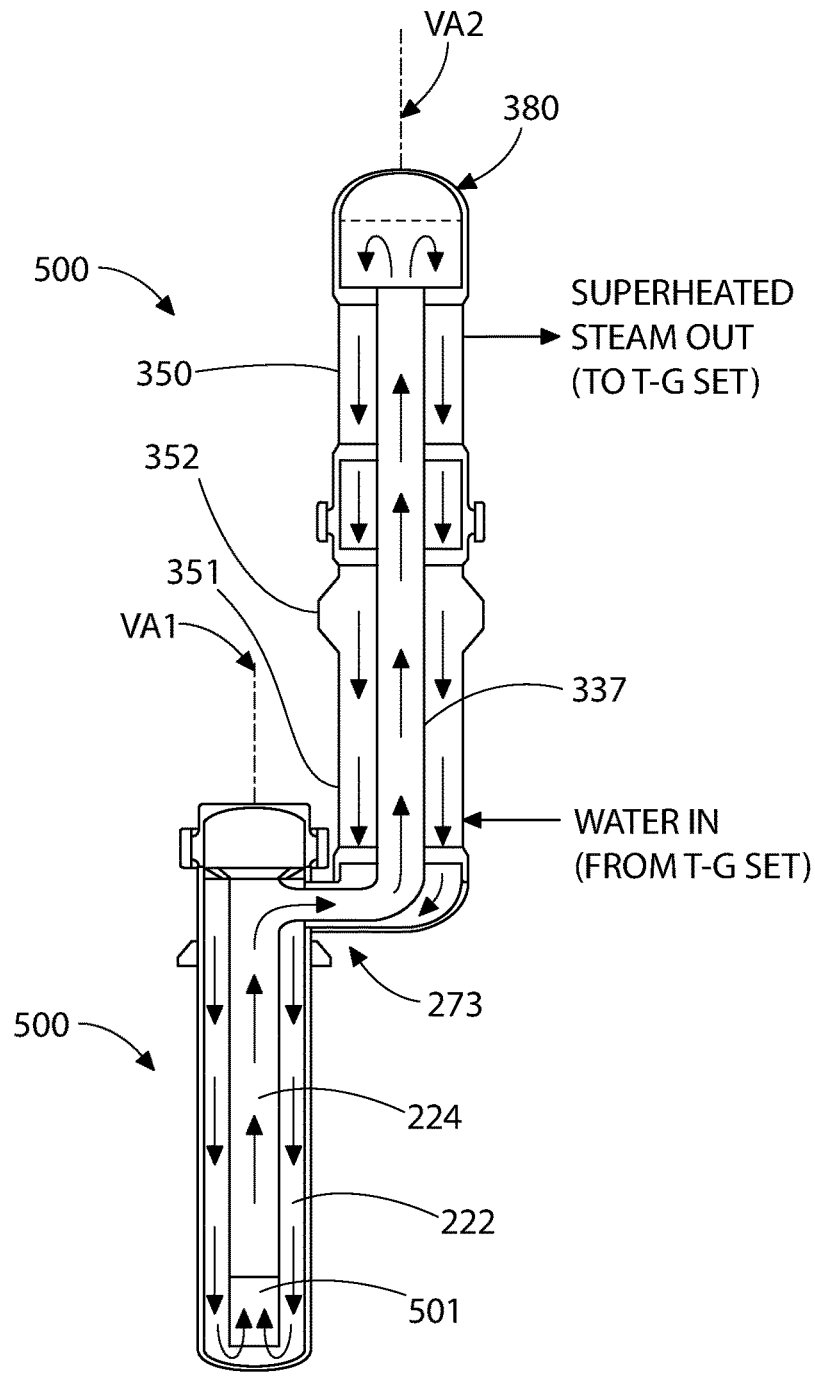
FIG. 24 is a schematic diagram showing the flow of primary and secondary coolant through the reactor vessel and steam generator.

The circulation flow loops of primary coolant (liquid water) and secondary coolant (liquid feedwater and steam) through the reactor vessel and steam generator during normal operation of the reactor and power plant with an available electric supply produced by the station turbine-generator (T-G) set is shown in FIG. 24 herein. The primary coolant flow between the fluidly coupled steam generator 502 and reactor vessel 500 forms a first closed flow loop for purposes of the present discussion. In one embodiment, the primary coolant flow is gravity-driven relying on the change in temperature and corresponding density of the coolant as it is heated in the reactor vessel 500 by nuclear fuel core 501, and then cooled in the steam generator 502 as heat is transferred to the secondary coolant loop of the Rankine cycle which drives the turbine-generator set. The pressure head created by the changing different densities of the primary coolant (i.e. hot—lower density and cold—higher density) induces flow or circulation through the reactor vessel-steam generating vessel system as shown by the directional flow arrows.

In general with respect to the first closed flow loop, the primary coolant is heated by the nuclear fuel core 501 and flows upwards in riser column 224. The primary coolant from the reactor vessel 500 then flows through the primary coolant fluid coupling 273 between the reactor vessel 500 and steam generator 502 and enters the steam generator. The primary coolant flows upward in the centrally located riser pipe 337 to a pressurizer 380 at the top of the steam generator. The primary coolant reverses direction and flows down through the tube side of the steam generator 502 and returns to the reactor vessel 500 through the fluid coupling 273 where it enters an annular downcomer 222 to complete the primary coolant flow loop.

Figure 11:
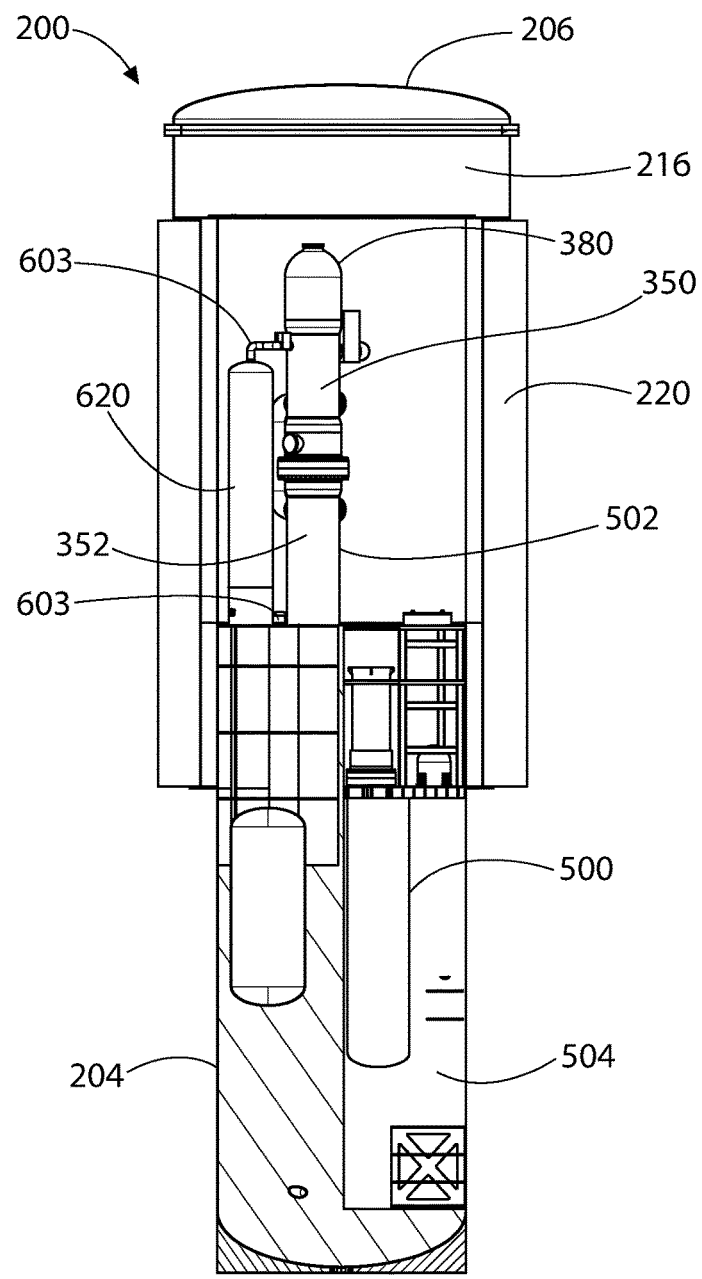
FIG. 11 is a longitudinal cross-sectional view thereof taken along line XI-XI in FIG. 10.
Figure 12:
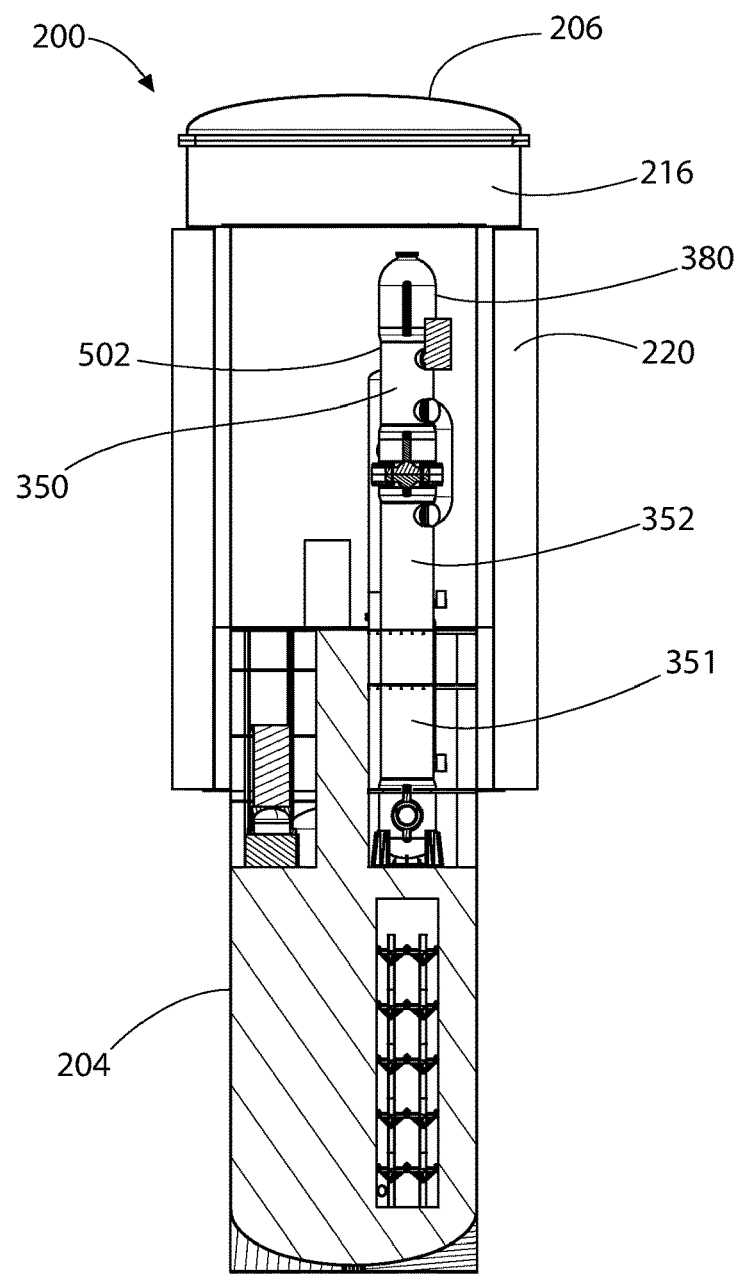
FIG. 12 is a longitudinal cross-sectional view thereof taken along line XII-XII in FIG. 10.
Figure 13:
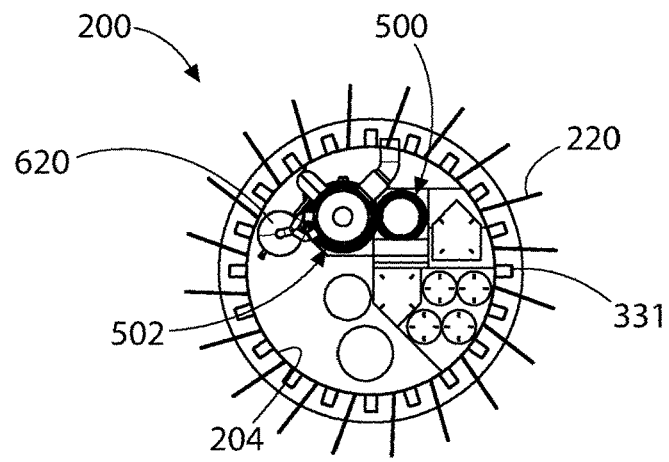
FIG. 13 is a transverse cross-sectional view thereof taken along line XIII-XIII in FIG. 9.
Figure 14:
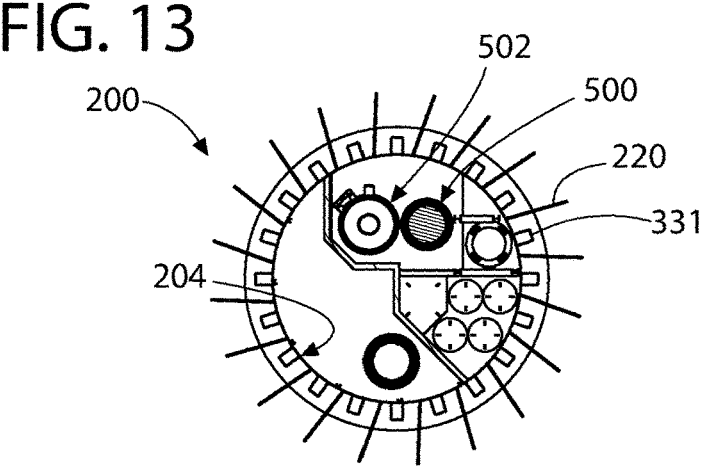
FIG. 14 is a transverse cross-sectional view thereof taken along line XIV-XIV in FIG. 9.
Figure 15:
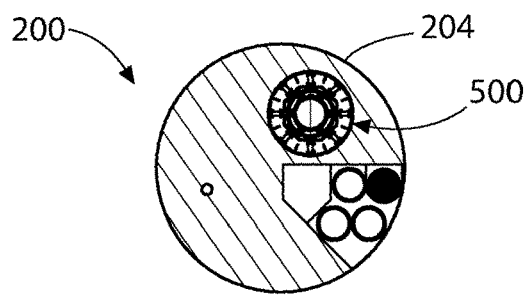
FIG. 15 is a transverse cross-sectional view thereof taken along line XV-XV in FIG. 9.

The steam generator 502 may include three vertically stacked heat transfer sections—from bottom up a preheater section 351, steam generator section 352, and superheater section 350 (see, e.g. FIGS. 11, 12, and 24). Secondary coolant flows on the shellside of the steam generator 502 vessel. Secondary coolant in the form of liquid feedwater from the turbine-generator (T-G) set of the Rankine cycle enters the steam generator at the bottom in the preheater section 351 and flows upwards through the steam generator section 352 being converted to steam. The steam flows upwards into the superheater section 350 and reaches superheat conditions. From there, the superheated steam is extracted and flows to the T-G set to produce electric power.

Figure 21:
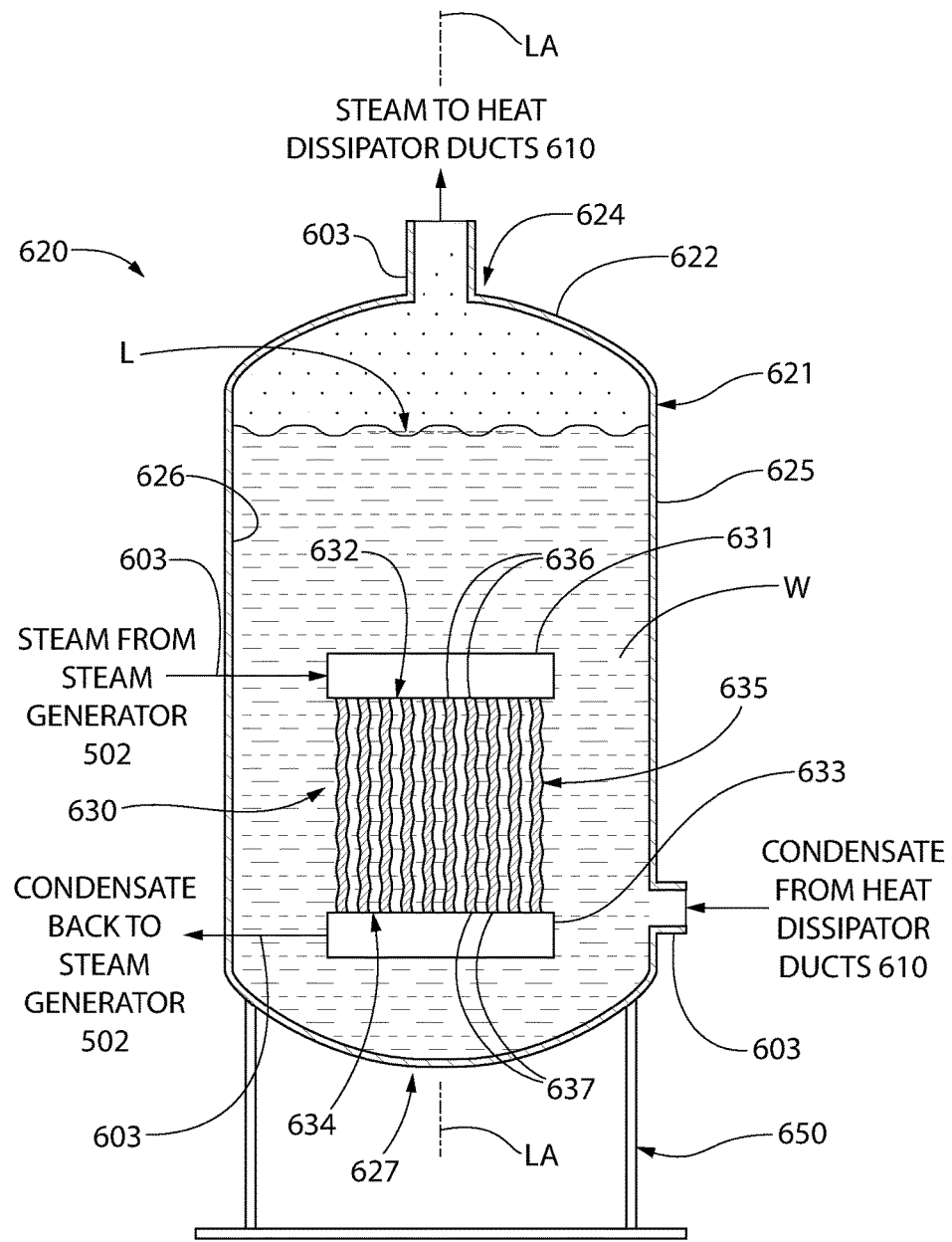
FIG. 21 is a schematic diagram of a submerged bundle heat exchanger (SBHX) according to the present disclosure.
Figure 22:
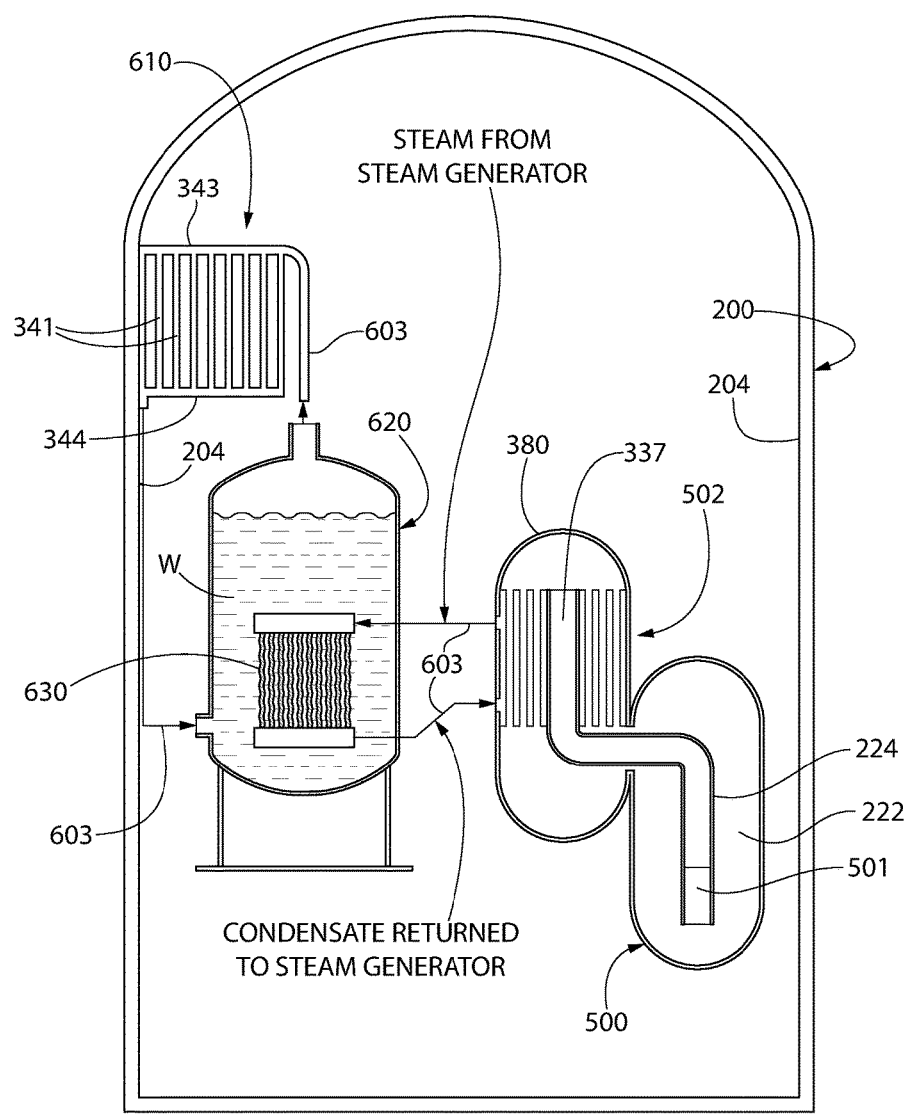
FIG. 22 is schematic diagram showing a first embodiment of a reactor cooling system and corresponding method for cooling a reactor core.
Figure 23:
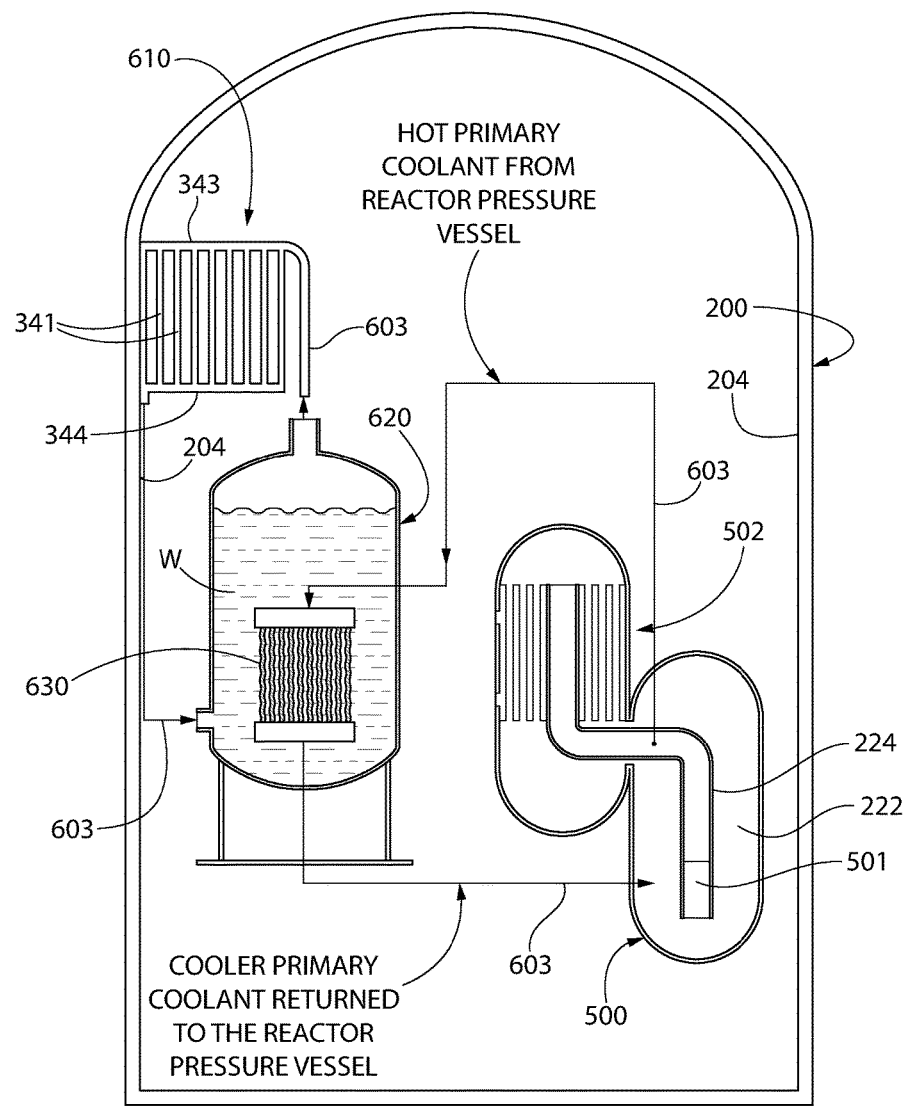
FIG. 23 is a schematic diagram showing a second embodiment of a reactor cooling system and corresponding method for cooling a reactor core.

Referring now to FIGS. 21-23, the submerged bundle heat exchanger 620 includes a pressure vessel 621 defining a longitudinal axis LA and having a hollow cylindrical shell 625 defining an internal cavity 626 and opposing top and bottom heads 622, 623 on opposite ends 624, 627 of the shell. The heads 622, 623 may be any suitable type and configuration, including flat, spherical, hemi-spherical, etc. Internal cavity 626 extends completely between the top and bottom heads 622, 623. The pressure vessel 621 may be axially elongated in shape and have a vertical orientation in one embodiment as shown to promote gravity flow. Preferably, the heat exchanger 620 is mounted and disposed inside the inner vessel 202 of the containment structure 200 above the reactor vessel 500 and in relatively close proximity to the steam generator 502. The close coupling of the heat exchanger 620 and steam generator 502 minimizes steam and condensate piping run lengths (see also FIGS. 11 and 13) and conserves horizontal space thereby minimizing the diameter needed for the containment vessel 200 to house the reactor vessel 500, steam generator 502, and heat exchanger. Any suitable structural base 650 may be provided to mount and support the heat exchanger 620 from the inner containment vessel 200 preferably from a structural steel and/or concrete platform or floor in the vessel to adequately support the weight of the heat exchanger.

A reserve or inventory (i.e. volume) of cooling water W (liquid) is held in the heat exchanger pressure vessel 621 which acts as a heat sink for cooling the secondary coolant during reactor shutdown event, as further described herein. Accordingly, the cooling water W serves as a heat sink of a third coolant which has an initial temperature which is less than the initial temperature of the secondary coolant during a shutdown.

The submerged bundle heat exchanger 620 may be a relatively a large cylindrical pressure vessel 621 housing a comparatively smaller heat exchanger tube bundle 630 disposed inside as shown in FIG. 21. In one example, without limitation, pressure vessel 621 may have an outer diameter of approximately 10 feet and a height of approximately 20 feet whereas the tube bundle 630 housed therein may be circular in transverse shape having a diameter of approximately 4 feet and a height less than the height of the pressure vessel. Other suitable dimensions may be provided. Accordingly, the tube bundle 630 in this embodiment does not substantially fill the entire cavity 626 of the pressure vessel 621.

Preferably, the tube bundle 630 may be positioned closer to the bottom end 627 and head 623 than the top end 624 and head 622 (see, e.g. FIG. 21). This positioning helps ensure that the tube bundle 630 remains substantially submerged for a majority or preferably all of its height in the inventory of liquid water W stored in the pressure vessel 621. Accordingly, in some embodiments the tube bundle 630 is completely surrounded by and immersed in the liquid condensate on all sides and parts. The tube bundle 630 may be elevated and spaced apart above the bottom head 623 of the heat exchanger pressure vessel 625 to provide a sufficient depth of water beneath the bundle to permit flow beneath the tube bundle on the shellside of the vessel. Any suitable arrangement of structural supports and brackets inside the pressure vessel 625 to fixedly support the tube bundle assembly 630 may be used.

Pressure vessel 621 may be made of any suitable metal capable of withstanding the steam and operating pressures anticipated from the steam generator 502. In some embodiments, pressure vessel 621 may be formed of a corrosion resistant material such as without limitation stainless steel. Other corrosion resistant metallic materials may be used.

The tube bundle 630 is disposed in cavity 626 of the pressure vessel 621. In one non-limiting configuration, tube bundle 630 assembly may include an inlet flow plenum 631 defining a top tube sheet 632, an outlet flow plenum 633 defining a bottom tube sheet 634 and spaced apart from the top tube sheet, and a plurality of tubes 635 extending between and fluidly coupled to the top and bottom tube sheets. The tube sheets 632, 634 each include a plurality of flow openings 636, 637 respectively which are in fluid communication with the inlet and outlet flow plenums 631, 633 and tubes 635. In operation and description of the flow path, flow enters the inlet flow plenum 631 and through openings 636 into one end of the tubes 635, exits the opposite end of the tubes 635 through openings 637 into outlet plenum 633, and leaves the outlet plenum.

In one embodiment, the tubes 635 of tube bundle 630 may be axially elongated and vertically oriented as shown. Other orientations are possible however such as horizontal, and angled between horizontal and vertical. The tubes 635 may have any suitable shape including without limitation straight, curvilinear such as helically coiled (see, e.g. FIG. 21) or another curvilinear configuration, or other appropriate shape. In one preferred embodiment, the tubes may have a curvilinear shape which maximizes available heat transfer surface area without requiring as much height as straight tubes having the same surface area. Any suitable diameter tubes and tube arrangement/pattern may be used. For example, single or multiple rows of tubes 635 may be provided; the number being dependent at least in part on the heat transfer requirements for the heat exchanger 620. In one embodiment, the tube bundle 630 may have a generally circular shape in transverse cross section.

Tubes 635 may be formed of any suitable preferably corrosion resistant metal having conductive heat transfer properties suitable for a given application. Some non-limiting examples of the tube materials that may be used include stainless steel, aluminum, titanium, corrosion resistant steel alloys, Inconel®, Monel®, or others.

The inlet and outlet flow plenums 631 and 633 each comprise a substantially hollow outer body of any suitable shape forming a pressure boundary and an open interior plenum. The tube sheets 632, 634 may have any suitable thickness and shape in plane including planar and arcuate (e.g. if the plenums are shapes as pipe sections) and in top plan view (e.g. circular for a round cross-sectional tube bundle). The tube sheets and plenums may be formed of any suitable corrosion resistant metal or metal alloy, some examples of which are mentioned above with respect to possible materials for tubes 635.

The submerged bundle heat exchanger 620 may variously be fluidly interconnected with and coupled to the steam generator 502, rector vessel 500, and heat dissipater ducts 610 by suitable steam and condensate piping 603 shown in FIGS. 22 and 23. The piping 603 is configured to establish the flow paths shown in these figures. Any suitable type of piping and materials may be used for piping 603 which may depend in part on whether the piping run is for conveying condensate or steam and their associated service temperatures and pressures anticipated. In some embodiments, for example without limitation, the piping preferably may be made of a corrosion resistant metal such as stainless steel or steel alloy. It is well within the ambit of those skilled in the art to select and design appropriate piping and related appurtenances such as valving. Notably, no pumps are involved to establish the flow paths shown in FIGS. 22 and 23 which are gravity driven.

Operation of the reactor cooling system 600 will now be briefly described. During the postulated reactor shutdown event such as a station black-out or similar event wherein power generation from the turbo-generator ceases and the normal non-safety active systems are unavailable, the main steam and main feedwater isolation valves (not shown) are first closed to isolate the steam generator 502 from the extra-containment power generation portion of Rankine cycle. Accordingly, the isolation valves shut off steam flow from the steam generator 502 to the turbine-generator (T-G) set and feedwater flow back to the steam generator returned from the T-G set in a well-known manner to those skilled in the art without further elaboration. Excess steam may first be dumped to the atmosphere before closing the main isolation valves. Closing the main isolation valves activates the reactor core cooling system 600. Two potential operating scenarios or methods for employing the cooling system 600 are disclosed and described in further detail below which passively (i.e. without electric power) continue cooling the reactor in the event of a shutdown to remove decay heat using the submerged bundle cooling system 602.

In a first operating scenario or method for cooling the reactor shown in FIG. 22, the steam produced in the steam generator 502 on the shellside in the upper half of the steam generator vessel (by residual decay heat generated from the now shut down reactor) is extracted and routed to the submerged bundle heat exchanger 620 where it condenses inside the tubes 635 of the submerged bundle heat exchanger 620 (see also FIG. 21). The condensing steam gives up its latent heat to the volume or inventory of water W (the third coolant) stored in the shellside of the submerged bundle heat exchanger pressure vessel 621 surrounding the tube bundle 630.

In one embodiment, the tube bundle 630 may be completely submerged in the inventory of water W inside the heat exchanger 620 so that the water provides the cooling medium on the outside of the tubes 635 for condensing the steam. In one embodiment, the tube bundle 630 preferably may be positioned near the longitudinal axis LA coinciding with the axial centerline of the submerged bundle heat exchanger 620 to evenly surround the tube bundle with water W on all sides to promote uniform cooling of all tubes 635 in bundle. Other mounting positions of the tube bundle however are possible. The inflow of steam and outflow of collected condensate may be controlled and maintained passively by appropriate design of the valving, piping, or other flow control devices (e.g. orifices, etc.) that do not rely on electric or another power source for operation.

On the tube side of the heat exchanger tube bundle 630, steam extracted from the steam generator 502 may enter the heat exchanger pressure vessel 621 at any convenient location. In one embodiment, the steam inlet piping 603 may penetrate laterally through the pressure vessel shell 625 and piping may extend inside the heat exchanger pressure vessel 621 to the inlet plenum 631 of tube bundle 630 to which it is fluidly coupled. Other steam inlet locations may be used such as without limitation through the top head 622.

The condensate collected in the lower plenum 633 of the tube bundle 630 is then returned to the shellside of the steam generator 502 via piping 603, purely by natural gravity flow. The condensate outlet piping 503 may be located in the general vicinity towards or near the bottom 627 of the heat exchanger pressure vessel 621 and is reintroduced back into the steam generator 502 at an injection point (e.g. preheater 351 section) lower than the extraction point of steam from the steam generator (e.g. superheater section 350) which is supplied to the submerged bundle heat exchanger 620. A second closed flow loop is established between the steam generator 502 and tube side of the submerged bundle heat exchanger 620 (i.e. tube bundle 630). Appropriate piping may be routed inside the pressure vessel 621 between the lower plenum 633 and shell 625 of the vessel which is then coupled to the condensate outlet piping 503 connected to the steam generator 503.

With continuing reference to the first operating scenario or method shown FIG. 22, the inventory of water W outside the tubes 635 in the shellside of the submerged bundle heat exchanger pressure vessel 621(which is fluidly isolated and separated from condensate on the tube side of the tube bundle 630) is heated by condensing steam inside the tube bundle which transfers it heat to the water. The water W acts as a heat sink for cooling the secondary coolant during reactor shutdown event. Accordingly, the water W serves as a third coolant which has an initial temperature that is less than the initial temperature of the secondary coolant during a shutdown. The water W gradually heats up during the reactor shutdown process. After a period of time, the water W reaches the boiling point temperature at which a portion of the water inventory is converted to steam. The steam accumulates in a steam space formed above the water line L in the pressure vessel 621 beneath the top head 622.

To cool the inventory of water W (third coolant) which provides the cooling fluid for condensing the secondary coolant steam inside the tube bundle 630, the accumulated steam on the shellside is extracted and routed via suitable piping 603 to the heat dissipater ducts 610 of the auxiliary heat dissipation system 340 described in detail above. The steam flows through the heat dissipater ducts 610 and is condensed in the manner already described. Specifically, the water in the annular reservoir (primary annulus 313) as a temperature lower than the temperature of the third coolant steam to form a heat sink for condensing the third coolant steam which transfers heat to the reservoir. The condensate is then returned to the submerged bundle heat exchanger 620 via suitable piping 603 and enters the shellside of the pressure vessel 621 where it is reintroduced into the inventory of water W. This cooling system helps to substantially maintain the water level keeping the tube bundle 630 submerged in water W beneath the water line L. This system further forms a third closed flow loop of steam and condensate using the heat dissipater ducts 610 to condense the steam which is distinct and isolated from the second closed flow loop formed on the tube side of the submerged bundle heat exchanger 620 and the steam generator 502. In summary, the first and second closed flow loops described herein function to cool the primary coolant and secondary coolant, respectively. The third closed flow loop cools the cooling fluid of the submerged bundle heat exchanger 620 (i.e. heat sink of water formed by inventory of water W) which indirectly contributes to cooling the secondary coolant vis-à-vis the tube bundle 630.

In the alternative second operating scenario or method for cooling the reactor shown in FIG. 23, the primary coolant in the reactor vessel 500 is directly cooled by the submerged bundle heat exchanger 620 rather than using the steam continuing to be produced in the steam generator 502 by the reactor decay heat. In this process arrangement, once the steam and feedwater isolation valves are closed, the hot primary coolant from the riser column 224 of the reactor pressure vessel ("hot leg") is routed via piping 603 directly to the tubeside of tube bundle 630 in the submerged bundle heat exchanger 620 (see FIGS. 23 and 24). The primary coolant will cool by rejecting its heat to the shellside water W in the submerged bundle heat exchanger 620 in a very much similar manner shown in FIG. 22 and described above while flowing downwards inside the tubes 635. A difference being that the primary coolant always remains substantially in liquid state during this entire cooling process and also when circulating through the reactor vessel 500. This cooling creates a natural circulation flow due to the buoyancy head created by the density difference between the hot primary coolant at the inlet to the submerged bundle heat exchanger 620 and the cold primary coolant at the outlet of the heat exchanger. The cooler primary coolant is routed via suitable piping 603 and re-introduced back into the annular downcomer 222 region of the reactor vessel 500 ("cold leg"). The submerged bundle heat exchanger 620 higher elevation with respect to the reactor vessel 500 and the size of the piping 603 that routes the primary coolant to the heat exchanger may be designed to ensure that there is adequate natural circulation flow to reject the heat from the core to the shellside water W in the heat exchanger.

In both the first and second methods for cooling the reactor described above, the quantity of water W in cavity 626 of the submerged bundle heat exchanger 620 is preferably sufficient to remove the decay heat from the reactor core (via the primary coolant) through sensible heating of shellside water in the early phase of the postulated reactor shutdown event when the decay heat generation is at its highest. The may be accomplished in part by adequately sizing the storage volume and size of the submerged bundle heat exchanger pressure vessel 621.

The operational interaction of the reactor cooling system 600 and air cooling system 400 of the containment structure will be briefly described. As described above, the remainder of the heat not used in condensing steam inside the tube bundle 630 of the heat exchanger 620 leads to the production of steam in the shellside of the heat exchanger by heating the inventory of water W. This shellside steam is routed to the heat dissipater ducts 610 where the steam condenses by rejecting its latent heat to the containment structure (e.g. inner containment vessel 200). The containment vessel 200 rejects the heat to the water in the annulus 313 between the containment structure and the containment enclosure structure 300 (and eventually to the ultimate heat sink or atmosphere) of the passive reactor containment protection system described herein. The condensed steam from the heat dissipater ducts 610 then drains back to a collection manifold (lower outlet ring header 344 shown in FIGS. 16 and 18) which in turn routes the condensate back to the submerged bundle heat exchanger 620 purely by gravity. As the cooling water inventory in the annulus 313 between the inner containment vessel 200 and outer containment enclosure structure 300 evaporates, the exposed inner containment vessel 200 will heat reject heat to the air now occupying the annulus 313 by natural convection. A fresh supply of air is provided by the inlet air conduits 401 (through suction) spaced circumferentially around the containment vessel 200 in the primary annulus 313 (see, e.g. FIG. 16 and foregoing description). Once all the water in the annular 313 has evaporated, the containment vessel 200 will continue to reject heat by air cooling alone. Air cooling after a prolonged period of water cooling (which removes a significant portion of reactor decay heat) is sufficient to remove all the decay heat. Since the submerged bundle cooling system 602 is a closed loop natural flow system, the cooling process can continue indefinitely.

It will be appreciated that variations and combinations of the foregoing two methods may be used to passively cool the reactor during a powerless reactor shutdown event.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A passive nuclear reactor shutdown cooling system comprising:
    a reactor vessel housing a nuclear fuel core, the reactor vessel containing a primary coolant heated by the fuel core;
    a heat exchanger including an inventory of liquid cooling water and a tube bundle, the tube bundle submerged in the liquid cooling water;
    the primary coolant circulating via gravity flow in a first closed flow loop between the submerged tube bundle and the reactor vessel;
    wherein the primary coolant transfers heat to the inventory of liquid cooling water in the heat exchanger and is cooled before flowing back to the reactor vessel in the first closed flow loop;
    wherein the reactor vessel and heat exchanger are commonly disposed inside a metal reactor containment vessel having a shell;
    wherein the heat transferred from primary coolant to the inventory of cooling water in the heat exchanger produces coolant steam;
    wherein the coolant steam is extracted from the heat exchanger and flows in a second closed flow loop to an array of heat dissipater ducts Integrally attached to an interior surface of the shell of the metal reactor containment vessel in a thermally conductive relationship, condenses, and flows back to the heat exchanger, thereby replenishing the inventory of liquid cooling water.

2. The system according to claim 1, wherein the heat dissipater ducts are circumferentially spaced around the interior surface of the shell of the reactor containment vessel.

3. The system according to claim 1, further comprising a reservoir containing water surrounding the reactor containment vessel, wherein the water in the reservoir is in contact with an exterior surface of the shell of the reactor containment vessel and has a temperature lower than the temperature of the coolant steam forming a heat sink which condenses the steam inside the heat dissipater ducts.

4. The system according to claim 3, wherein a heat transfer path between the coolant steam in the heat dissipater ducts and the annular cooling reservoir via the first metal shell of the containment vessel is in a direction transverse to the flow of the coolant steam through the heat dissipater ducts.

5. The system according to claim 3, wherein the reservoir has an annular shape and is formed between the reactor containment vessel and an outer containment enclosure structure.

6. The system according to claim 1, wherein hot primary coolant is extracted from a riser column inside the reactor pressure vessel and is routed via piping to a tubeside of the tube bundle in the heat exchanger.

7. The system according to claim 6, wherein cooled primary coolant is re-introduced back into an annular downcomer region of the reactor vessel surrounding the riser column.

8. The system according to claim 1, wherein the primary coolant flows on a tubeside of the tube bundle of the heat exchanger and the liquid coolant is on a shellside of the heat exchanger.

9. The system according to claim 1, further comprising a steam generator fluidly coupled to the reactor vessel and containing a secondary coolant, the primary coolant during normal operation of the reactor when the passive nuclear reactor shutdown cooling system is not in operation circulating between the reactor vessel and steam generator, the primary coolant transferring heat to the secondary coolant in the steam generator and producing secondary coolant steam.

10. The system according to claim 1, wherein the heat exchanger comprises a hollow cylindrical shell holding the inventory of liquid cooling water and the submerged tube bundle therein.

11. A passive nuclear reactor shutdown cooling system comprising:
    an inner reactor containment vessel having a first metal shell and an outer containment enclosure structure having a second metal shell;
    an annular cooling reservoir filled with cooling water disposed between the reactor containment vessel and the containment enclosure structure, the cooling water in the annular cooling reservoir forming a heat sink in which the cooling water is in wetted contact with the first metal shell of the containment vessel and the second metal shell of the containment enclosure structure;
    a reactor vessel disposed inside the reactor containment vessel and housing a nuclear fuel core, the reactor vessel containing a primary coolant heated by the fuel core;
    a heat exchanger disposed inside the reactor containment vessel, the heat exchanger comprising a hollow shell including an inventory of a first coolant liquid and a tube bundle, the tube bundle submerged in the first coolant liquid;
    the primary coolant circulating via gravity flow in a first closed flow loop between the submerged tube bundle and the reactor vessel;
    wherein the heated primary coolant transfers heat to the inventory of first coolant liquid in the heat exchanger and is cooled before flowing back to the reactor vessel in the first closed flow loop;
    wherein the heat transferred from primary coolant to the inventory of first coolant liquid in the heat exchanger produces first coolant steam in the heat exchanger;
    wherein the first coolant steam is extracted from the heat exchanger and flows in a second closed flow loop to an array of heat dissipater ducts integrally attached to an interior surface of the first metal shell of the reactor containment vessel in a thermally conductive relationship;
    wherein the first coolant steam in the heat dissipater ducts transfers heat to the cooling water in the annular cooling reservoir through the first metal shell of the reactor containment vessel, condenses into first coolant liquid, and flows back to the heat exchanger, thereby replenishing the inventory of first coolant liquid.

12. The system according to claim 11, wherein a heat transfer path between the coolant steam in the heat dissipater ducts and the annular cooling reservoir via the first metal shell of the reactor containment vessel is in a direction transverse to the flow of the first coolant steam through the heat dissipater ducts.

13. The system according to claim 1, wherein the heat dissipater ducts are welded to the interior surface of the shell of the metal reactor containment vessel.

14. The system according to claim 11, wherein the heat dissipater ducts are welded to the interior surface of the first metal shell of the reactor containment vessel.

\* \* \* \* \*